United States Patent
Wang et al.

(10) Patent No.: US 11,057,829 B2
(45) Date of Patent: Jul. 6, 2021

(54) POWER SAVING FOR NON-TRIGGER-BASED RANGING

(71) Applicant: Apple Inc., Cupertino, CA (US)

(72) Inventors: Qi Wang, Sunnyvale, CA (US); Christiaan A. Hartman, Mountain View, CA (US); Oren Shani, Saratoga, CA (US); Rafi Vitory, Or-Akiva (IL); Roy Beeri, Tel-Aviv (IL); Yoav Feinmesser, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/550,508

(22) Filed: Aug. 26, 2019

(65) Prior Publication Data

US 2020/0077334 A1    Mar. 5, 2020

Related U.S. Application Data

(60) Provisional application No. 62/724,553, filed on Aug. 29, 2018.

(51) Int. Cl.
    *H04W 52/02*     (2009.01)
    *H04W 64/00*     (2009.01)
    *H04W 84/12*     (2009.01)

(52) U.S. Cl.
    CPC ....... *H04W 52/0209* (2013.01); *H04W 64/00* (2013.01); *H04W 84/12* (2013.01)

(58) Field of Classification Search
    CPC ......... H04W 52/0229; H04W 52/0216; H04W 52/0209; H04W 84/12; H04W 64/00; H04W 52/0235
    See application file for complete search history.

(56) References Cited

U.S. PATENT DOCUMENTS 10,034,188 B2   7/2018   Ben-Haim
2015/0319631 A1*   11/2015   Aldana ................ H04L 5/0055
                                                         370/252

(Continued)

FOREIGN PATENT DOCUMENTS

WO   WO2018080597 A1   5/2018
WO   WO2018102247 A2   6/2018

OTHER PUBLICATIONS

Office Action from Korean Application No. 10-2019-0105806, dated Mar. 18, 2020, eight pages.

(Continued)

*Primary Examiner* — Charles T Shedrick
(74) *Attorney, Agent, or Firm* — Kowert, Hood, Munyon, Rankin & Goetzel, P.C.

(57) ABSTRACT

Methods for performing a ranging procedure according to the non-trigger-based protocol may include negotiating timing parameters associated with the ranging procedure, performing a ranging measurement, and transmitting/receiving, after completion of the ranging measurement, a message announcing initiation of another ranging measurement. The timing parameters may indicate a time window in which an initiating device can initiate a subsequent ranging measurement and the message announcing initiation of the second ranging measurement may be received during the time range specified. Timing parameters may indicate a responding device's required minimum and maximum time between ranging measurements. Additional parameters may indicate an initiating device's required minimum and maximum time between ranging measurements. A power savings mode may be entered after the first ranging measurement and during at least a portion of a time period specified by the parameters.

20 Claims, 19 Drawing Sheets

(56) References Cited

U.S. PATENT DOCUMENTS

| | | | |
|---|---|---|---|
| 2016/0057186 A1* | 2/2016 | Jose | H04W 64/00 |
| | | | 370/312 |
| 2016/0241373 A1* | 8/2016 | Marri Sridhar | H04W 64/00 |
| 2017/0215131 A1* | 7/2017 | Qi | H04W 76/14 |
| 2018/0048742 A1 | 2/2018 | Venkatesan | |
| 2019/0059101 A1* | 2/2019 | Jiang | H04W 64/00 |
| 2019/0132814 A1* | 5/2019 | Jiang | G01S 13/765 |
| 2019/0141631 A1* | 5/2019 | Patil | H04W 52/0229 |
| 2020/0068520 A1* | 2/2020 | Marri Sridhar | G01S 13/765 |
| 2020/0169841 A1* | 5/2020 | Das | H04W 4/023 |

OTHER PUBLICATIONS

Yongho Seok (MEDIATEK), "802.11az Range Measurement Protocol Update", IEEE Draft, 11-18-0729-01-00AZ-Range-Measurement-Protocol-Update, IEEE-SA Mentor, Piscataway, NJ USA, vol. 802.11az, No. 1, May 8, 2018, pp. 1-5.

Ganesh Venkatesan (Intel Corporation), "802.11az Negotiation Protocol (Update)", IEEE Draft, 11-18-0788-05-00AZ-802-IIAZ-Negotiation-Protocol-Update-Amendment-Text, IEEE-SA Mentor, Piscataway, NJ USA, vol. 802.11az, No. 5, Jul. 12, 2018, pp. 1-16.

Extended European Search Report, European Patent Application No. 19194443.8, dated Dec. 17, 2019, nine pages.

* cited by examiner

POWER SAVING FOR NON-TRIGGER-BASED RANGING

PRIORITY DATA

This application claims benefit of priority to U.S. Provisional Application Ser. No. 62/724,553, titled "Power Saving for VHTz Ranging", filed Aug. 29, 2018, by Qi Wang, Christiaan A. Hartman, Oren Shani, Rafi Vitory, Roy Beeri, and Yoav Feinmesser, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging can provide the distance between one wireless device and another (e.g., the distance between wireless nodes and/or wireless stations). However, in existing wireless communication technologies ranging sensitivity may be bounded by data decode sensitivity. Accordingly, improvements in the field are desired.

SUMMARY

Embodiments described herein relate to non-trigger-based ranging between wireless devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a ranging procedure according to a non-trigger-based protocol (formerly referred to/known as VHTz protocol) may include a wireless device negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify a time range (e.g., a time window and/or time duration) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the wireless device and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

In some embodiments, a ranging procedure according to the VHTz protocol may include a wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and the wireless device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1A:
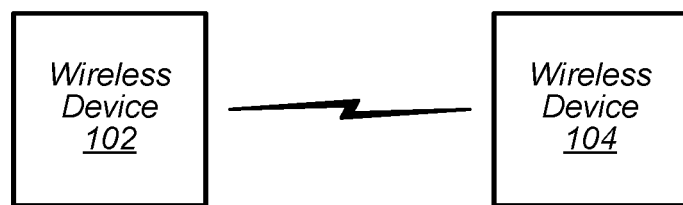
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
TX: Transmission/Transmit
RX: Reception/Receive
LAN: Local Area Network
WLAN: Wireless LAN
RAT: Radio Access Technology
TTL: time to live
SU: Single user
MU: Multi user
NDP: Null Data Packet
NDPA: NDP Announcement
VHT: 802.11 very high throughput
VHTz: Formerly an NDP sounding-based 802.11az SU protocol
iSTA: Initiating station of a ranging procedure
rSTA: Responding station of a ranging procedure
ToA: time of arrival of a packet
ToD: time of departure of a packet
LMR: location measurement report
SIFS: short interframe space
FTM: fine timing measurement Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
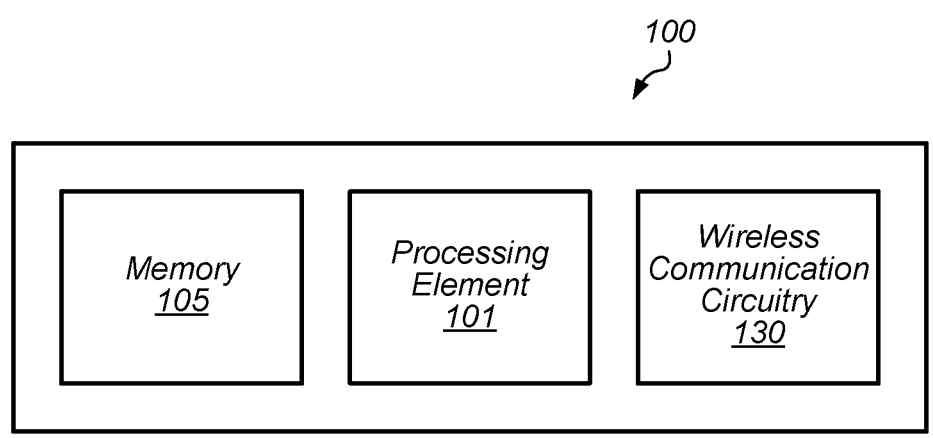
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, handheld device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may perform a ranging procedure according to a non-trigger-based ranging protocol that includes the wireless device negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the wireless device and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As another example, a wireless device (e.g., either of wireless devices 102 or 104) may be configured to perform a ranging procedure according to a non-trigger-based ranging protocol that includes the wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify (and/or indicate) a time range in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and the wireless device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
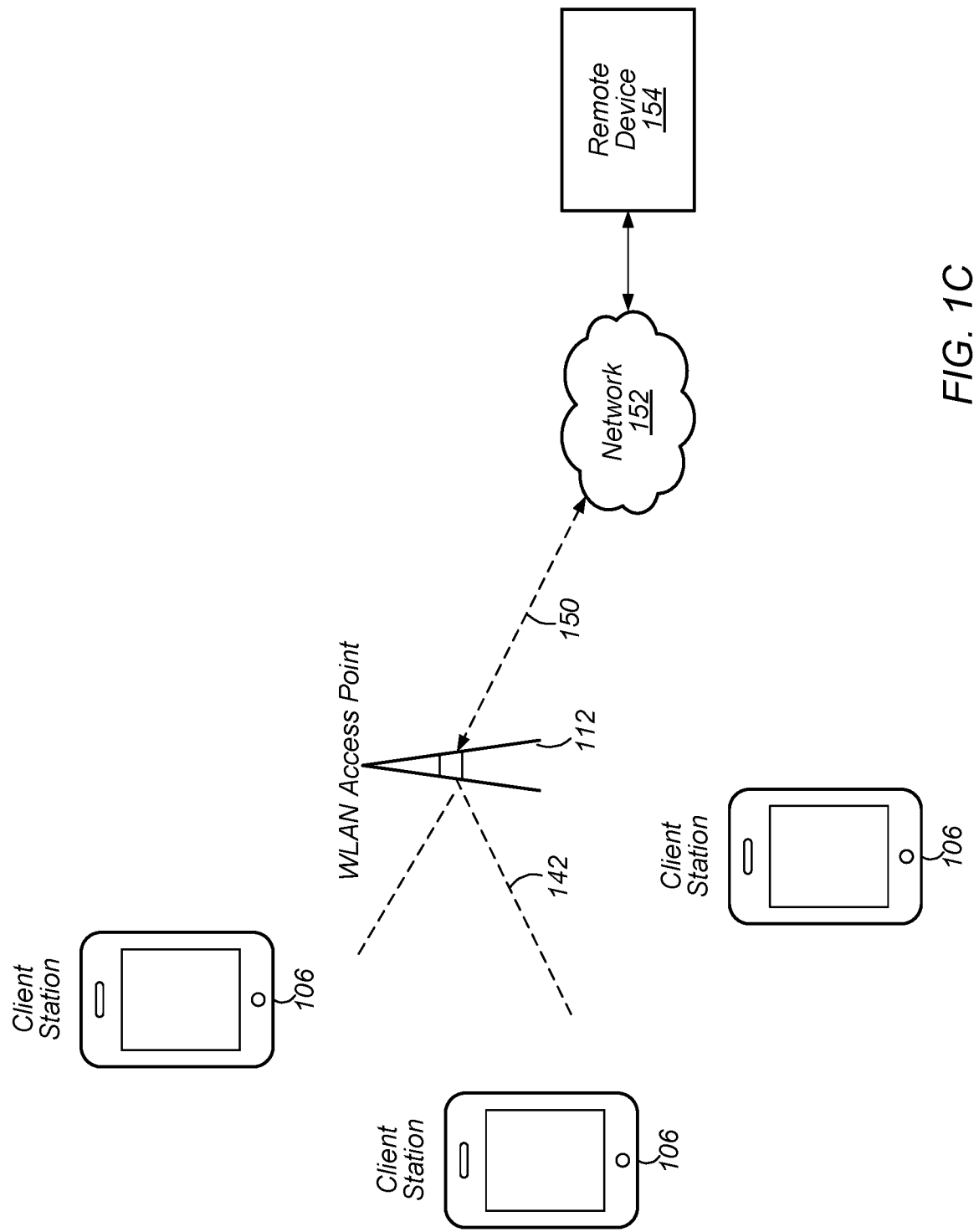
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 (which may be an exemplary implementation of device 100) may be configured to perform a ranging procedure according to a non-trigger-based ranging protocol that includes the wireless device 106 negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify (and/or indicate) a time range (and/or a time window) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the wireless device 106 and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As another example, a wireless device 106 may be configured to perform a ranging procedure according to a non-trigger-based ranging protocol that includes the wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and the wireless device 106 may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

Figure 2:
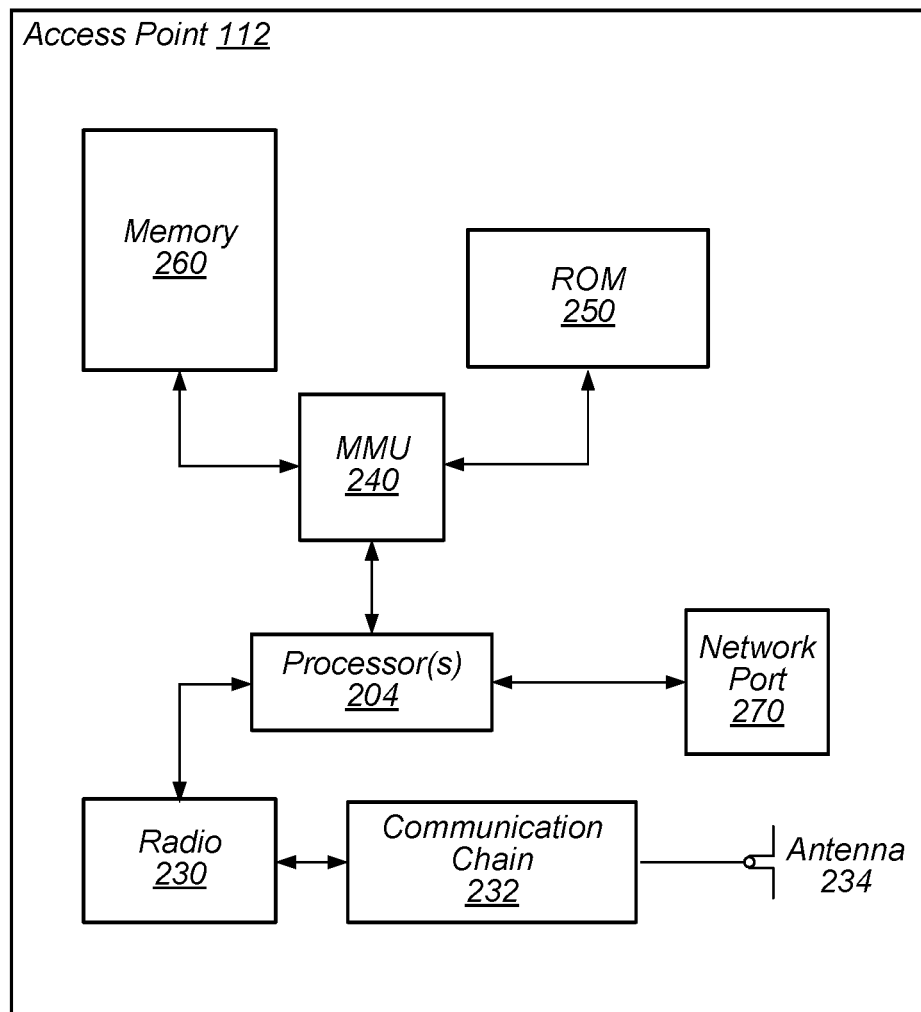
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform a ranging procedure according to a non-trigger-based ranging protocol that includes the AP 112 negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the AP 112 and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As another example, an AP 112 may be configured to perform a ranging procedure according to a non-trigger-based ranging protocol that includes the wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify (and/or indicate) a time range (and/or a time window) in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and the AP 112 may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

Figure 3A:
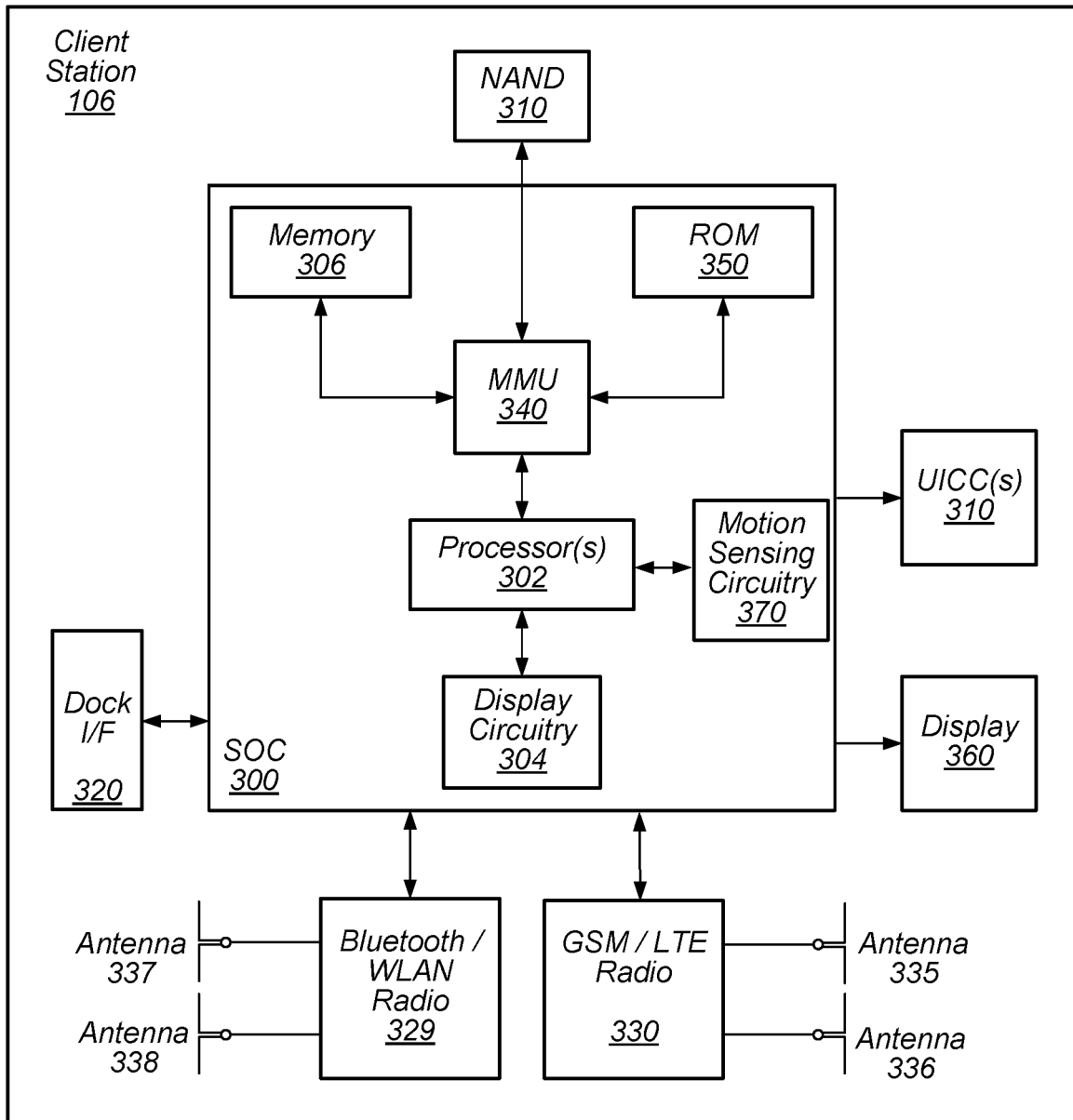
FIG. 3A illustrates an example simplified block diagram of a wireless station (UE), according to some embodiments.

FIG. 3A—Client Station Block Diagram

FIG. 3A illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, as further described below, client station 106 may be configured to perform a ranging procedure according to a non-trigger-based ranging protocol that includes the client station 106 negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify (and/or indicate) a time range (and/or a time window) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the client station 106 and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As another example, a client station 106 may be configured to perform a ranging procedure according to a non-trigger-based ranging protocol that includes the wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and client station 106 may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 3B:
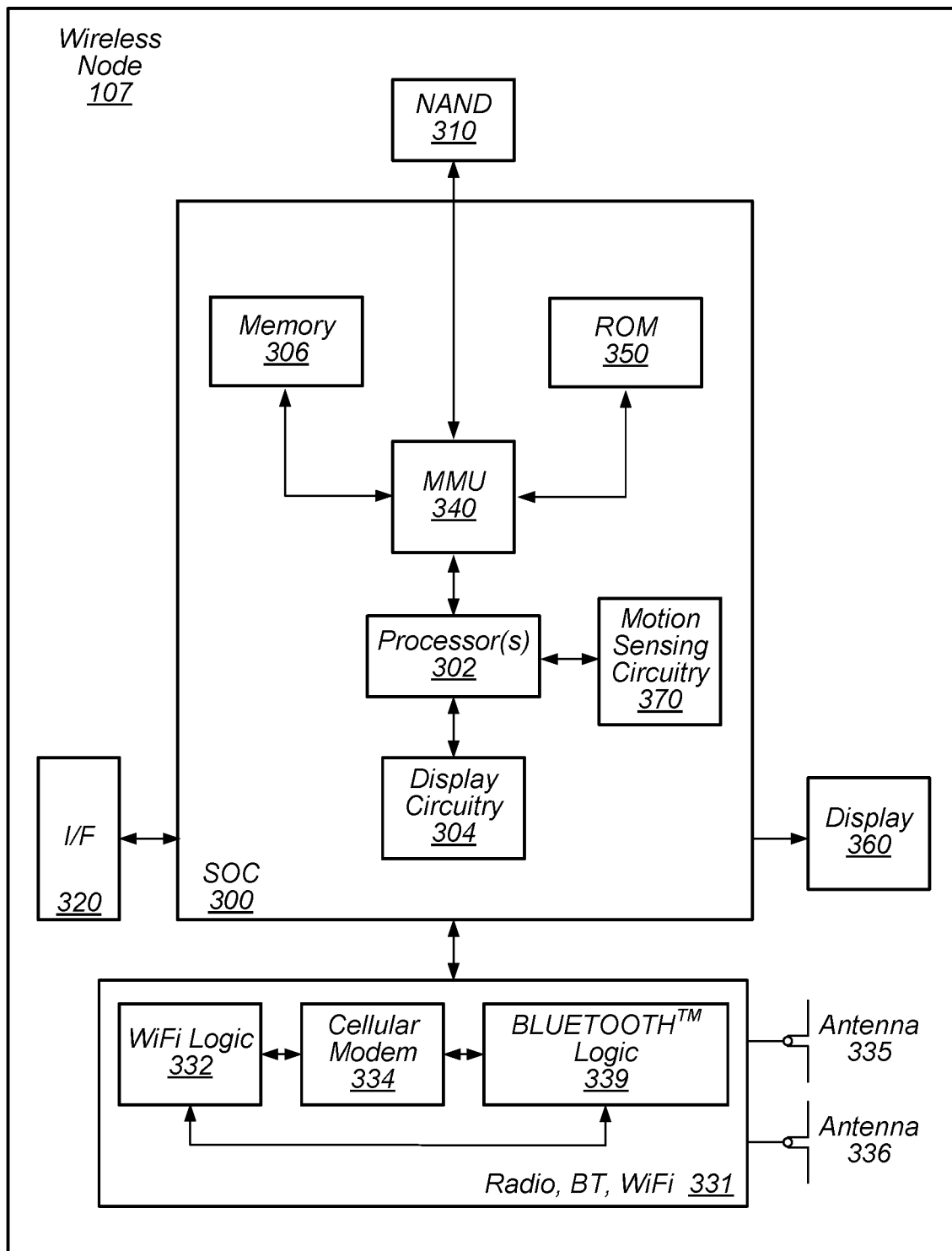
FIG. 3B illustrates an example simplified block diagram of a wireless node, according to some embodiments.

FIG. 3B—Wireless Node Block Diagram

FIG. 3B illustrates one possible block diagram of a wireless node 107, which may be one possible exemplary implementation of the device 100 illustrated in FIG. 1B. As shown, the wireless node 107 may include a system on chip (SOC) 300, which may include portions for various purposes. For example, as shown, the SOC 300 may include processor(s) 302 which may execute program instructions for the wireless node 107, and display circuitry 304 which may perform graphics processing and provide display signals to the display 360. The SOC 300 may also include motion sensing circuitry 370 which may detect motion of the wireless node 107, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the wireless node 107. For example, the wireless node 107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless node 107 may include at least one antenna, and in some embodiments, multiple antennas 335 and 336, for performing wireless communication with base stations and/or other devices. For example, the wireless node 107 may use antennas 33 and 336 to perform the wireless communication. As noted above, the wireless node 107 may in some embodiments be configured to communicate wirelessly using a plurality of wireless communication standards or radio access technologies (RATs).

The wireless communication circuitry 331 may include Wi-Fi Logic 332, a Cellular Modem 334, and Bluetooth Logic 339. The Wi-Fi Logic 332 is for enabling the wireless node 107 to perform Wi-Fi communications, e.g., on an 802.11 network. The Bluetooth Logic 339 is for enabling the wireless node 107 to perform Bluetooth communications.

The cellular modem 334 may be capable of performing cellular communication according to one or more cellular communication technologies. Some or all components of the wireless communication circuitry 331 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 331 (e.g., Wi-Fi Logic 332) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to perform a ranging procedure according to a non-trigger-based ranging protocol that includes the wireless node 107 negotiating timing parameters associated with the ranging procedure, performing a first ranging measurement of the ranging procedure, and receiving, after completion of the first ranging measurement, a message announcing initiation of a second ranging measurement of the ranging procedure. The timing parameters may specify a time range (and/or indicate a time window) in which an initiating device can initiate a subsequent ranging measurement and the message announcing initiation of the second ranging measurement may be received during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the wireless node 107 and the initiating device may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

As another example, a wireless node 107 may be configured to perform a ranging procedure according to a non-trigger-based ranging protocol that includes the wireless device negotiating timing parameters associated with the ranging procedure, performing a first ranging measurement of the ranging procedure, and transmitting, after completion of the first ranging measurement, a message announcing initiation of a second ranging measurement of the ranging procedure. The timing parameters may specify (and/or indicate) a time range (e.g., a time window and/or time duration) in which an initiating device can initiate a subsequent ranging measurement and the message announcing initiation of the second ranging measurement may be transmitted during the time range specified. In some embodiments, a first parameter of the timing parameters may specify (and/or indicate) a responding device's required minimum time between ranging measurements and a second parameter of the timing parameters may specify (and/or indicate) a responding device's required maximum time between ranging measurements. In some embodiments, the first and second parameters may be based, at least in part, on power saving, processing, and/or storage requirements (and/or limitations) of the responding device. In some embodiments, either or both of the responding device and the wireless node 107 may enter a power savings mode after the first ranging measurement and during at least a portion of the time period specified by the first parameter. In some embodiments, the first and second timing parameters may be based, at least in part, on timing parameters specified by the initiating device. In some embodiments, the timing parameters specified by the initiating device may include a third parameter of that may specify (and/or indicate) an initiating device's required minimum time between ranging measurements and a fourth parameter that may specify (and/or indicate) an initiating device's required maximum time between ranging measurements. In some embodiments, the third and fourth parameters may be based, at least in part, on power saving, processing, and/or storage requirements (and/or limitations) of the initiating device.

Wireless Ranging

In some implementations, two wireless devices may engage in a ranging operation so that at least one of the wireless devices will be able to determine or estimate the range (e.g., distance) between the two devices, e.g., by measuring an amount of time that it takes to send messages between the devices. For example, the Fine Timing Measurement (FTM) protocol specified in 802.11-2016 may provide a time-of-flight based mechanism to perform ranging between two 802.11/Wi-Fi devices. In FTM, range may be determined as a function of several time instances (t1, t2, t3 and t4), where t1, t2, t3, and t4 correspond to the time of departure and time of arrival of measurement frames sent in both directions (e.g., uplink and downlink) between the two devices (e.g., the two STAs). Standards under development (e.g., 802.11az) may aim to improve and/or optimize the ranging protocols for a variety of use cases, including ranging using a non-trigger-based mode, ranging using a trigger-based (formerly referred to/known as HEz) mode, and/or ranging in the 60 GHz band, among others.

Figure 4:
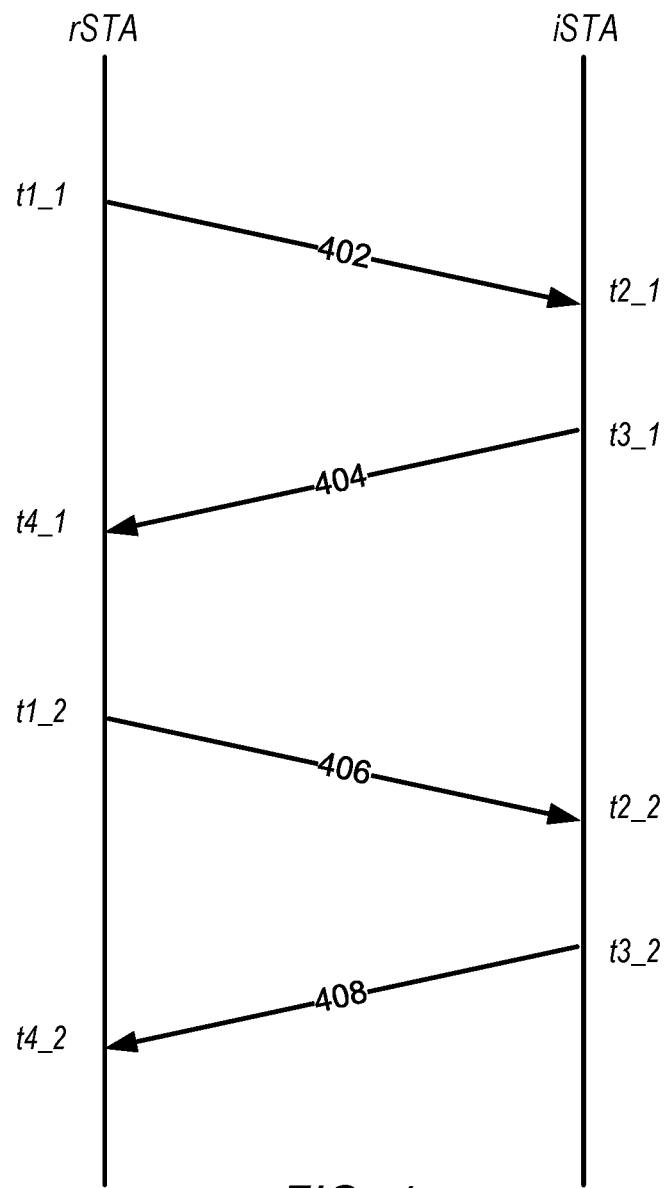
FIG. 4 illustrates a diagram of an example of signaling for a ranging procedure.

In some general ranging implementations, for example, as illustrated by FIG. 4, two round trip equations may be used to solve two equations to determine a ranged between devices. As shown, after a negotiation (e.g., to determine a number of ranging measurement rounds and/or other parameters associated with a ranging procedure), a responding device (rSTA) may transmit a ranging message 402 to an initiating device (iSTA) at time t1_1. Note that the initiating device (and/or station) may be considered as the device that initiated the negotiation of the ranging procedure. The ranging message 402 may be a Fine Timing Measurement (FTM) frame that includes one or more time of departure (ToD) and time of arrival (ToA) timestamps captured during a prior measurement round. In addition, the FTM frame may include a dialog token that may be incremented with each measurement round. In addition, each FTM frame, as well as each acknowledgment frame, may include (and/or have appended) a known preamble (e.g., training sequence). The initiating device may receive the ranging message 402 at time t2_1. After processing the ranging message 402, the initiating device may transmit, at time t3_1, a response message 404 (e.g., an acknowledgment of ranging message 402). The responding device may receive the response message 404 at time t4_1. The responding device may process the response message 404 and may transmit a ranging message 406 at time t1_2. The ranging message 406 may include data (and/or timestamps) associated with times t1_1 and t4_1. The initiating device may receive the ranging message 406 at time t2_2. At this point, the initiating device may calculate a round trip time (RTT) based on t1_1, t2_1, t3_1, and t4_1. In addition, the initiating device may send a response message 408 to confirm receipt of ranging message 406. The responding device may receive the response message 408 at time t4_2. The process may be repeated for the remaining measurement rounds. In some implementations, if a transmission error occurs (e.g., an iSTA fails to receive a ranging message or an rSTA fails to receive a response message), a retransmission (e.g., of a ranging message) of the failed message may occur. In some implementations, the retransmission may be subject to the retransmission including identical ranging data as the missed transmission, the retransmission updating an included dialog token if the failed message included a non-zero dialog token, and the retransmission updating a sequence number in a medium access control (MAC) header.

VHTz Ranging Protocol

Figure 5A:
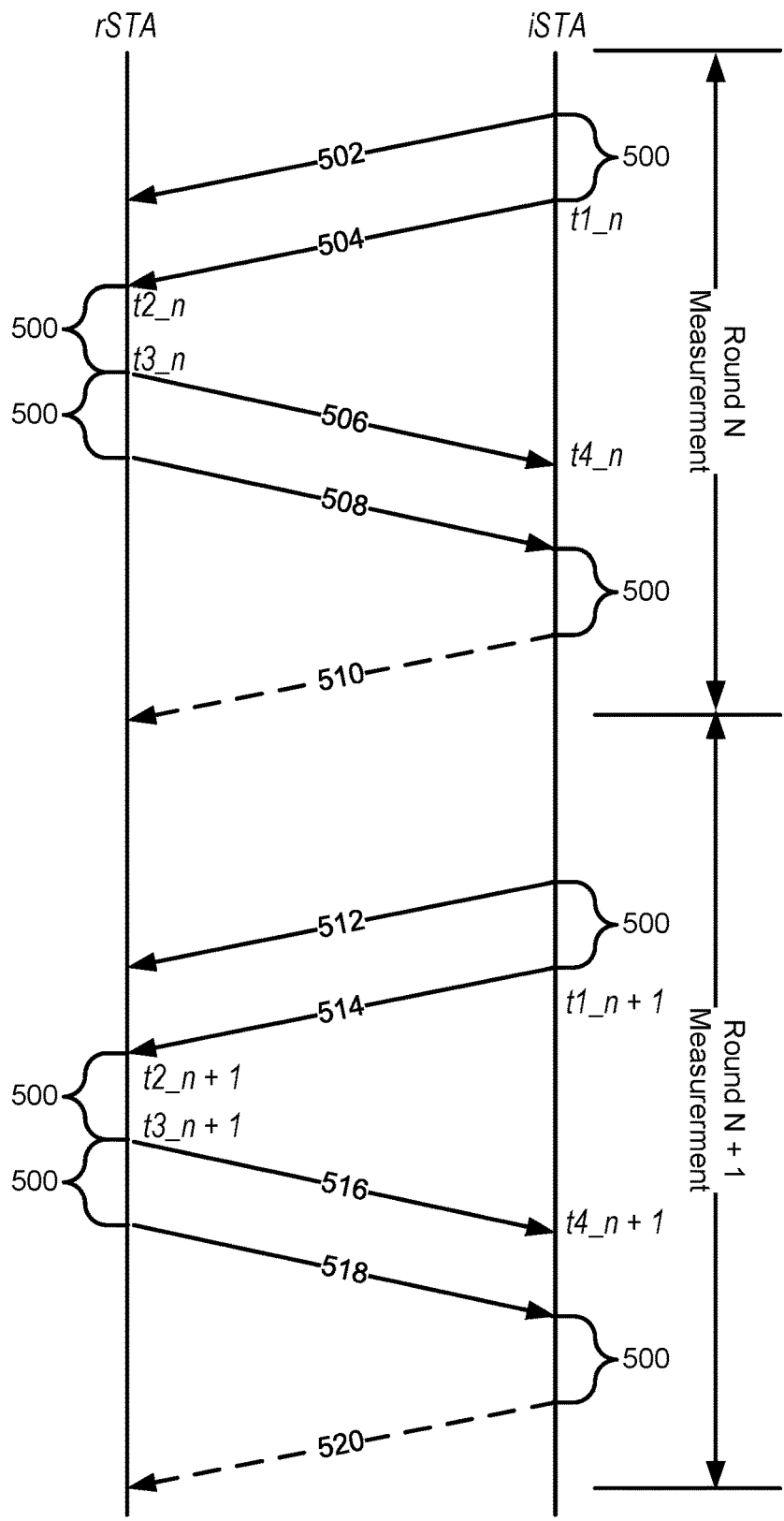
FIG. 5A illustrates a diagram of an example of signaling for a VHTz ranging procedure.

VHTz was a measurement exchange mode specified in IEEE 802.11az. IEEE 802.11az is an IEEE 802.11 amendment specifying next generation positioning protocols and requirements. For example, VHTz was a very high transport (VHT) null data packet (NDP) sounding-based single user (SU) protocol for a ranging procedure between an initiating station (iSTA) and a responding station (rSTA). As another example, HEz was a high efficiency WLAN (HEW) NDP sounding-based multi-user (MU) protocol for a ranging procedure also specified in IEEE 802.11az. FIG. 5A illustrates a diagram of an example of signaling for a VHTz ranging procedure. As shown, an iSTA may transmit an uplink (UL) NDP announcement (NDPA) 502 to an rSTA to initiate an VHTz measurement round (e.g., round N measurement). After a short interframe space (SIFS) 500, the iSTA may transmit an UL NDP 504 at time t1_n to the rSTA. The rSTA may receive the UL NDP 502 at time t2_n. Then, after another SIFS 500, the rSTA may transmit a downlink (DL) NDP 506 to the iSTA at time t3_n. The iSTA may receive the DL NDP 506 at time t4_n. Further, after another SIFS 500, the rSTA may transmit a location measurement report (LMR) 508 that includes the receipt time (e.g., t2_n) of UL NDP 504 and the transmit time (e.g., t3_n) of DL NDP 506. The iSTA may then calculate the distance, $\delta_n$, between the iSTA and the rSTA as shown in equation (1):

$$\delta_n = \frac{c[(t4_n - t1_n) - (t3_n - t2_n)]}{2} \quad (1)$$

where c is the speed of light in a vacuum (e.g., approximately 300,000 kilometers per second (186,000 miles per second)).

Upon completion of the round of measurement, the process may be repeated as shown in FIG. 5A. For example, the iSTA may initiate the measurement round (e.g., round N+1 measurement) by transmitting an UL NDPA 512 to the rSTA followed by an UL NDP 514 transmitted after SIFS 500 at time t1_n+1. The rSTA may receive the UL NDP 514 at time t2_n+1 and may transmit, after SIFS 500, a DL NDP 516 at time t3_n+1. The iSTA may receive DL NDP 516 at time t4_n+1. In addition, the rSTA may transmit an LMR 518 after SIFS 500 to the iSTA. The LMR 518 may include times t2_n+1 and t3_n+1. The iSTA may then calculate the distance, $\delta_{n+1}$, between the iSTA and the rSTA as shown in equation (2):

$$\delta_{n+1} = \frac{c[(t4_{n+1} - t1_{n+1}) - (t3_{n+1} - t2_{n+1})]}{2} \quad (2)$$

Figure 6A:
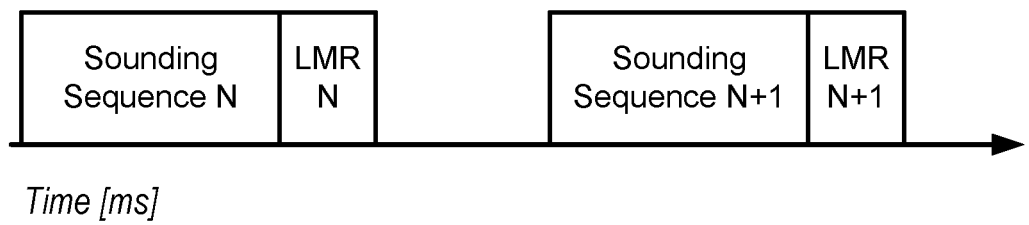
FIGS. 6A-6B illustrate examples of timing for LMRs for a VHTz ranging procedure.
Figure 6B:
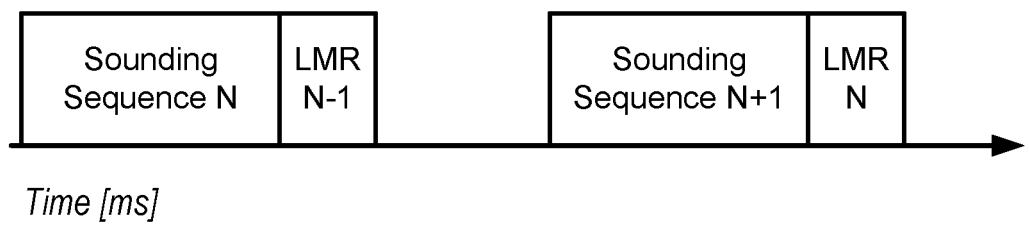

Note that in some implementations as further discussed below, the LMR 508 may include timing information from a prior measurement round (e.g., t2_n−1 and t3_n−1) instead of the current measurement round. For example, FIGS. 6A-6B illustrate examples of timing for LMRs for a VHTz ranging procedure. As shown in FIG. 6A, in some implementations, the LMR (e.g., LMR N) for sounding sequence N (e.g., VHTz measurement round N) may include timing information for the sounding sequence N. In addition, an LMR of the subsequent sound sequences (e.g., sounding sequence N+1) may include timing information for the corresponding sounding sequence (e.g., LMR N+1). However, in some implementations, the LMR may be delayed by at least one sounding round, e.g., as illustrated in FIG. 6B. As shown in FIG. 6B, the LMR (e.g., LMR N−1) transmitted immediately after sounding sequence N (e.g., VHTz measurement round N) may include timing information for the previous sounding sequence N−1. In addition, subsequent sound sequences (e.g., sounding sequence N+1_) may include timing information for the prior sounding sequence (e.g., LMR N).

Returning to FIG. 5A, in some implementations, the iSTA may transmit, after a SIFS 500, an LMR 510 (and/or LMR 520) to the rSTA that includes the transmit time of UL NDP 504 (e.g., t1_n) and the receipt time (e.g., t4_n) of DL NDP 506. In some implementations, the transmission of LMR 510 (e.g., whether or not the iSTA will transmit LMR 510) may be negotiated prior to the start of the measurement sequence (e.g., transmission of UL NDPA 502). Note that in some implementations as further discussed below, the LMR 510 may include timing information from a prior measurement round (e.g., t1_n−1 and t4_n−1) instead of the current measurement round.

In some implementations, an rSTA may use various parameters to control when an iSTA may initiate another (e.g., N+1) round of measurements, and further, when the iSTA may receive an LMR. In some implementations, the parameters may be based on an rSTA's processing time and/or storage capability (ability). For example, an rSTA may specify (and/or indicate) a minimum time required to process a time of arrival (ToA) via a MinToAReady parameter. The MinToAReady may specify (and/or indicate) that an iSTA can receive an rSTA-to-iSTA LMR only after the MinToAReady specified time, which may range from 0 to 25.5 milliseconds in some implementations. In addition, the rSTA may specify (and/or indicate) a maximum time that the rSTA may retain measurement data (e.g., t2 and t3) via a MaxToAAvailable parameter, which may range from 256 milliseconds to 140 minutes. As a further example, the rSTA may specify (and/or indicate) a minimum time that an iSTA is required to wait between consecutive measurements when initiating a range measurement via a MinTimeBetweenMeasurements parameter. Note that the VHTz protocol assumes that an rSTA is always available. Thus, the constraints the rSTA may place on the iSTA are only based on the timestamp processing time and timestamp storage time and does not consider an rSTA's need to save (and/or conserve) power.

Figure 5B:
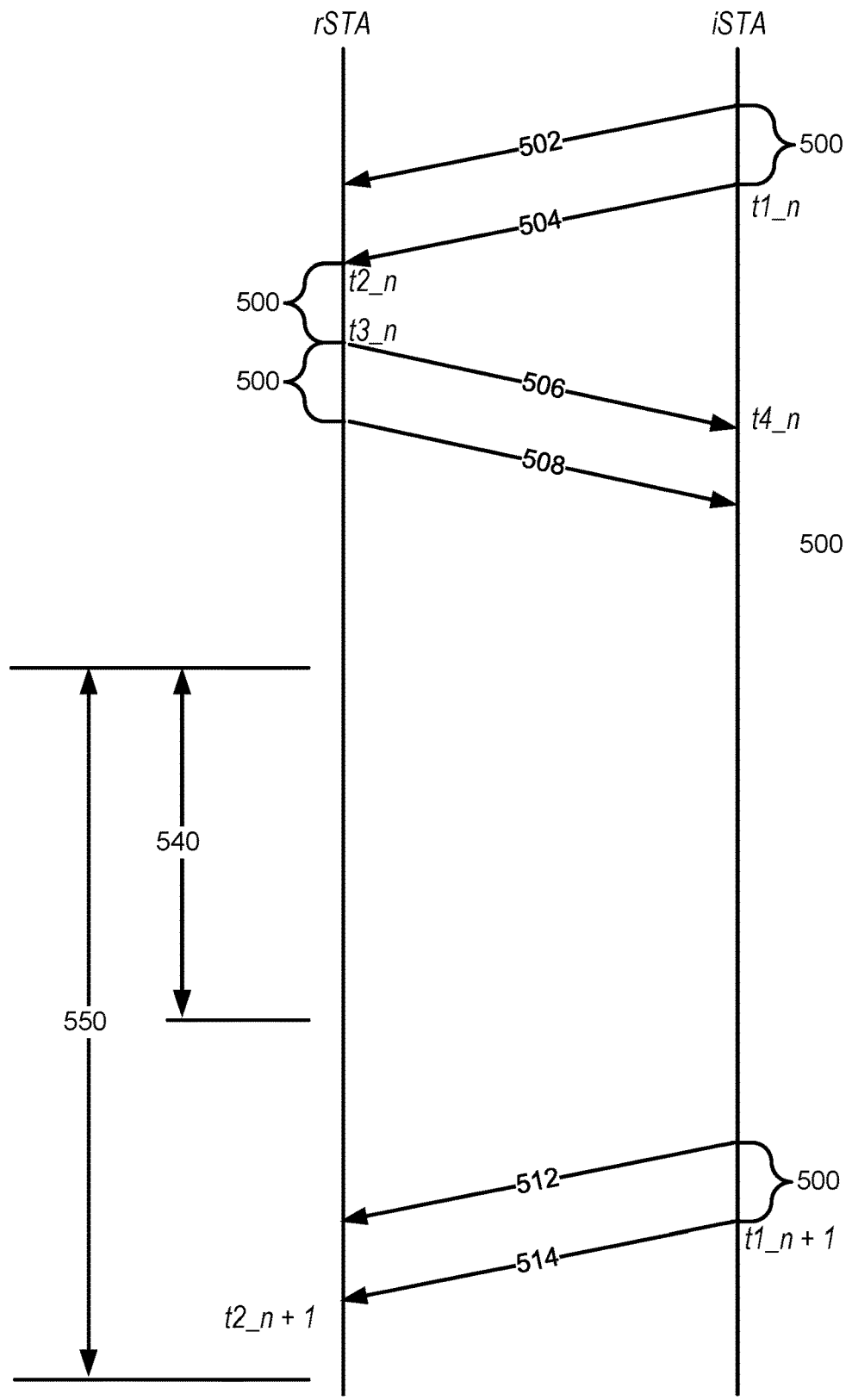
FIG. 5B illustrates an example of an immediate rSTA-to-iSTA LMR for a VHTz ranging procedure.

For example, FIG. 5B illustrates an example of an immediate rSTA-to-iSTA LMR for a VHTz ranging procedure. In such scenarios, the parameter MinToAReady may be set to zero to indicate the immediate transmission of the LMR 508. In addition, the rSTA may specify (and/or indicate) a MinTimeBetweenMeasurements time 540 and a MaxToAAvailable time 550. The time 540 may be less than or equal to the time 550. Note that according to current implementations (e.g., current VHTz specifications), the rSTA may commit to being available (awake) during the difference between time 540 and time 550. Thus, the MaxToAAvailable parameter is an ill-defined concept for an immediate rSTA-to-iSTA LMR, as the LMR containing measurement results for measurement round N is available and delivered immediately after the measurement of round N (e.g., via LMR 508). Further, the timing of the measurement round N+1 does not depend on how long the rSTA keeps the results of a prior measurement round (e.g., measurement round N).

Figure 5C:
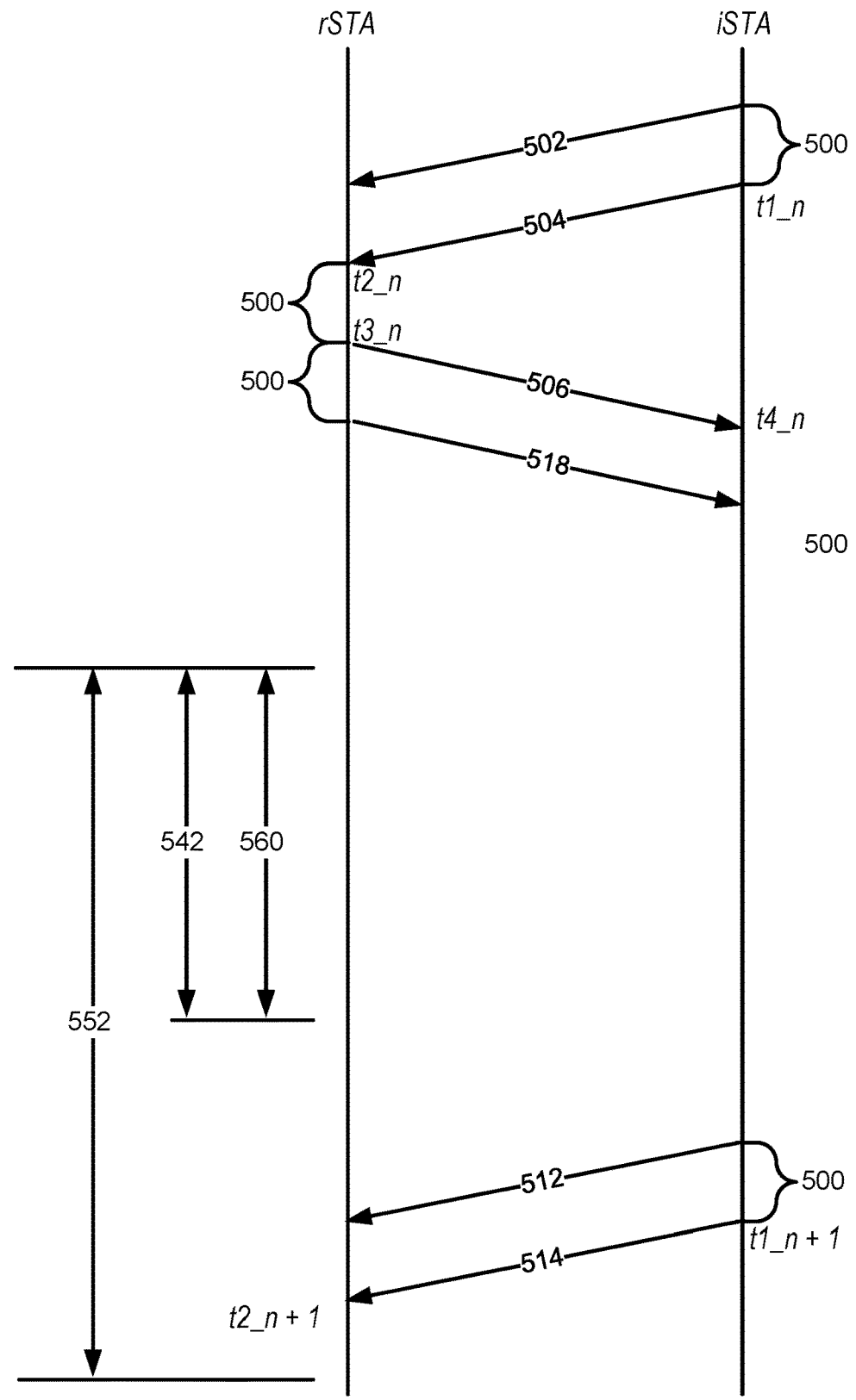
FIG. 5C illustrates an example of a delayed rSTA-to-iSTA LMR for a VHTz ranging procedure.

As another example, FIG. 5C illustrates an example of a delayed rSTA-to-iSTA LMR for a VHTz ranging procedure. In such scenarios, the parameter MinToAReady may be set to a value greater than zero to indicate the delayed LMR 518. In addition, the rSTA may specify (and/or indicate) a MinTimeBetweenMeasurements time 542 and a MaxToAAvailable time 552 as well as a MinToAReady time 560. Note that the time 552 may be greater than the time 560 and the time 542 may be equal to the time 560. Note that according to current implementations, the rSTA may provide valid measurement results to the iSTA if the iSTA initiates a measurement sequence after 542 and 560, but before the end of time 552. As a result, the rSTA may commit to being available (awake) during the difference between time 542 and time 552, e.g., a duration of time during which the LMR may be available. For example, if MinToAReady is specified as 25.5 milliseconds and MaxToAAvailable is specified as 256 milliseconds, the rSTA may be required to remain awake for 230.5 milliseconds (e.g., the difference in the specified times) to wait for the arrival of UL NDPA 512.

Figure 7:
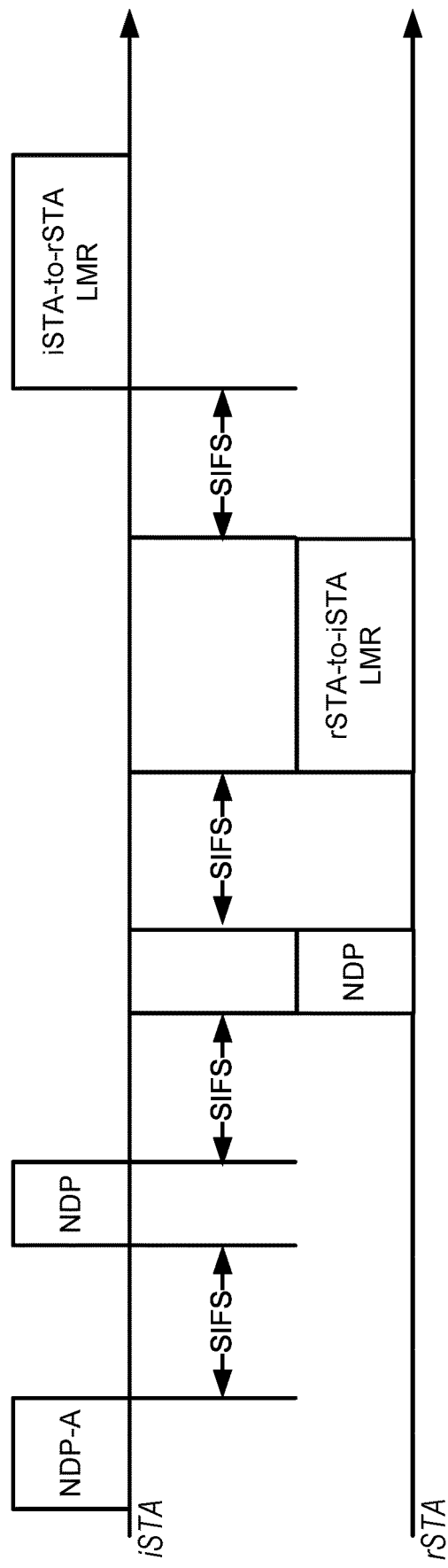
FIG. 7 illustrates a diagram of an example of timing for transmitting an iSTA-to-rSTA LMR for a VHTz ranging procedure.

As noted above, in some implementations, the iSTA and rSTA may negotiate whether the iSTA transmits an LMR to the rSTA (e.g., an iSTA-to-rSTA LMR). In some implementations, the iSTA may transmit the LMR to the rSTA either immediately or as a delayed LMR. For example, FIG. 7 illustrates a diagram of an example of timing for transmitting an iSTA to rSTA LMR for a VHTz ranging procedure. As shown, the iSTA may initiate a measurement round with an NDP-A transmitted to the rSTA. Then, after a SIFS, the iSTA may transmit an NDP to the rSTA. Once the NDP is received by the rSTA and after a SIFS, the rSTA may transmit an NDP to the iSTA. Further, after a SIFS, the rSTA may transmit an rSTA-to-iSTA LMR. Once the rSTA-to-iSTA LMR is received by the iSTA and after a SIFS, the iSTA may transmit an iSTA-to-rSTA LMR to the rSTA. However, in current implementations, the iSTA, unlike the rSTA, has no mechanism for specifying timestamp processing time and/or storage availability. Thus, when a delayed iSTA-to-rSTA LMR is transmitted (e.g., per negotiation), there is no mechanism for the devices to consider the iSTA's timing and storage limitations when determining timing for a subsequent round of measurements.

Non-Trigger-Based Ranging Procedure

Embodiments described herein provide mechanisms for initiating and responding devices of a non-trigger-based ranging procedure to constrain timing to allow for power savings and to account for both devices' processing and storage limitations. In some embodiments, a flow control method may constrain timing that an initiating device (e.g., such as devices 106, 107 and/or 112) may request for a subsequent round of ranging measurements. Thus, in some embodiments, timing for a subsequent round of ranging measurements may be based, at least in part, on any or all of a responding device's power saving requirements, processing limitations (e.g., time required to process timestamps of a measurement round), and/or storage limitations (e.g., time limits on storing timestamps). In some embodiments, time for a subsequent round of ranging measurements may be based (and/or further based), at least in part, on any or all of an initiating device's power saving requirements, processing limitations (e.g., time required to process timestamps of a measurement round), and/or storage limitations (e.g., time limits on storing timestamps).

In some embodiments, a responding device (e.g., such as devices 106, 107 and/or 112) may announce during negotiations with an initiating device a minimum time between measurements and a maximum time between measurements. In some embodiments, a minimum time interval that an initiating device is required to wait between consecutive measurement rounds may be specified by a MinTimeBetweenMeasurement_rSTA (and/or MinTBM_r) parameter. In some embodiments, a maximum time interval that an initiating device may wait between consecutive measurement rounds may be specified by a MaxTimeBetweenMeasurment_rSTA (and/or MaxTBM_r) parameter. Note that in some embodiments, these parameters (e.g., MinTBM_r and/or MaxTBM_r) may be announced by the responding station instead of MinToAReady, MaxToAAvailable, and/or MinTimeBetweenMeasurment parameters.

In some embodiments, the initiating device (e.g., e.g., such as devices 106, 107 and/or 112) may announce during negotiations a minimum time between measurements and a maximum time between measurements. In some embodiments, a minimum time interval that an initiating device can support between consecutive measurement rounds may be specified by a MinTimeBetweenMeasurement_iSTA (and/or MinTBM_i) parameter. In some embodiments, a maximum time interval that an initiating device can support between consecutive measurement rounds may be specified by a MaxTimeBetweenMeasurment_iSTA (and/or MaxTBM_i) parameter. In some embodiments, the initiating device may only announce these parameters if the LMR will be a delayed LMR.

In some embodiments, a responding station may determine MinTBM_r and MaxTBM_r based on one or more parameters. For example, the responding station may consider a minimum time it requires to process timestamps associated with the non-trigger-based ranging procedure. In addition, the responding station may consider a maximum time that it can store timestamps. Further, the responding station may consider its power constraints when determining the parameters (e.g., whether the responding station needs to conserve power via a sleep period). In some embodiments, the responding station may also consider an initiating station's minimum time between measurements and maximum time between measurements, if announced by the initiating station. In some embodiments, the responding station may take into account other internal factors.

In some embodiments, an initiating station may determine MinTBM_i and MaxTMB_i based on one or more parameters. For example, the initiating station may consider a minimum time it requires to process timestamps associated with the non-trigger-based ranging procedure. In addition, the initiating station may consider a maximum time that it can store timestamps. Further, the initiating station may consider its power constraints when determining the parameters (e.g., whether the initiating station needs to conserve power via a sleep period). In some embodiments, the initiating station may take into account other internal factors.

In some embodiments, during a negotiation, if a responding station cannot accommodate a MinTBM_i and/or a MaxTBM_i of an initiating station, the negotiation may fail (e.g., be discontinued) and a re-negotiation between the responding and initiating station may be performed with updated parameters. In some embodiments, during a negotiation, if an initiating station does not accept (and/or cannot accommodate) a MinTBM_r and/or a MaxTBM_r announced by a responding station, the initiating station may reject the parameters and initiate a re-negotiation of the parameters. In some embodiments, during a negotiation, if an initiating station does accept (and/or can accommodate) a MinTBM_r and a MaxTBM_r announced by a responding station, the initiating station may be required to use the parameters when determining timing for initiating a subsequent round of ranging measurements.

Figure 8A:
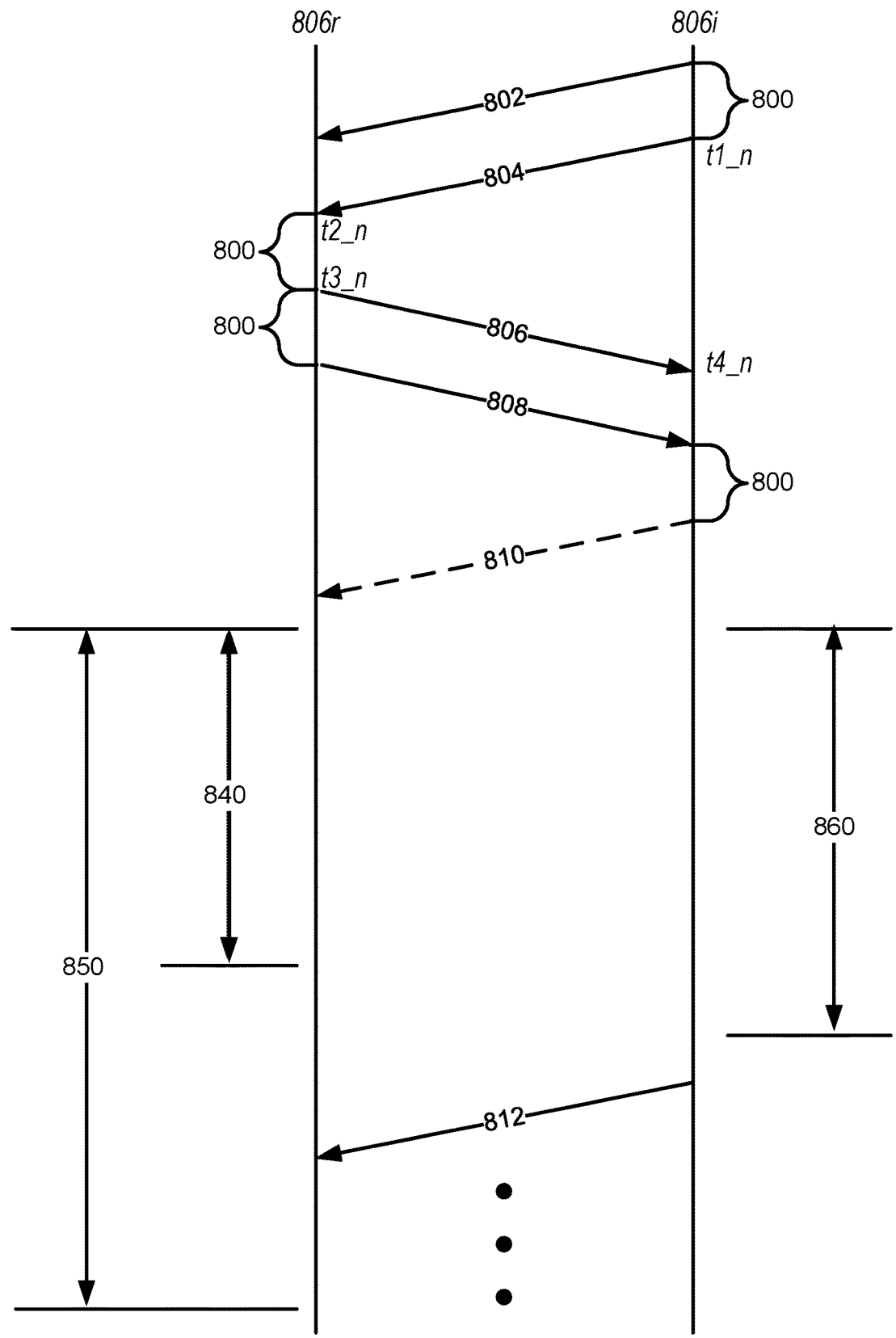
FIGS. 8A-8F illustrate examples of signaling for non-trigger-based ranging procedures, according to some embodiments.
Figure 8B:
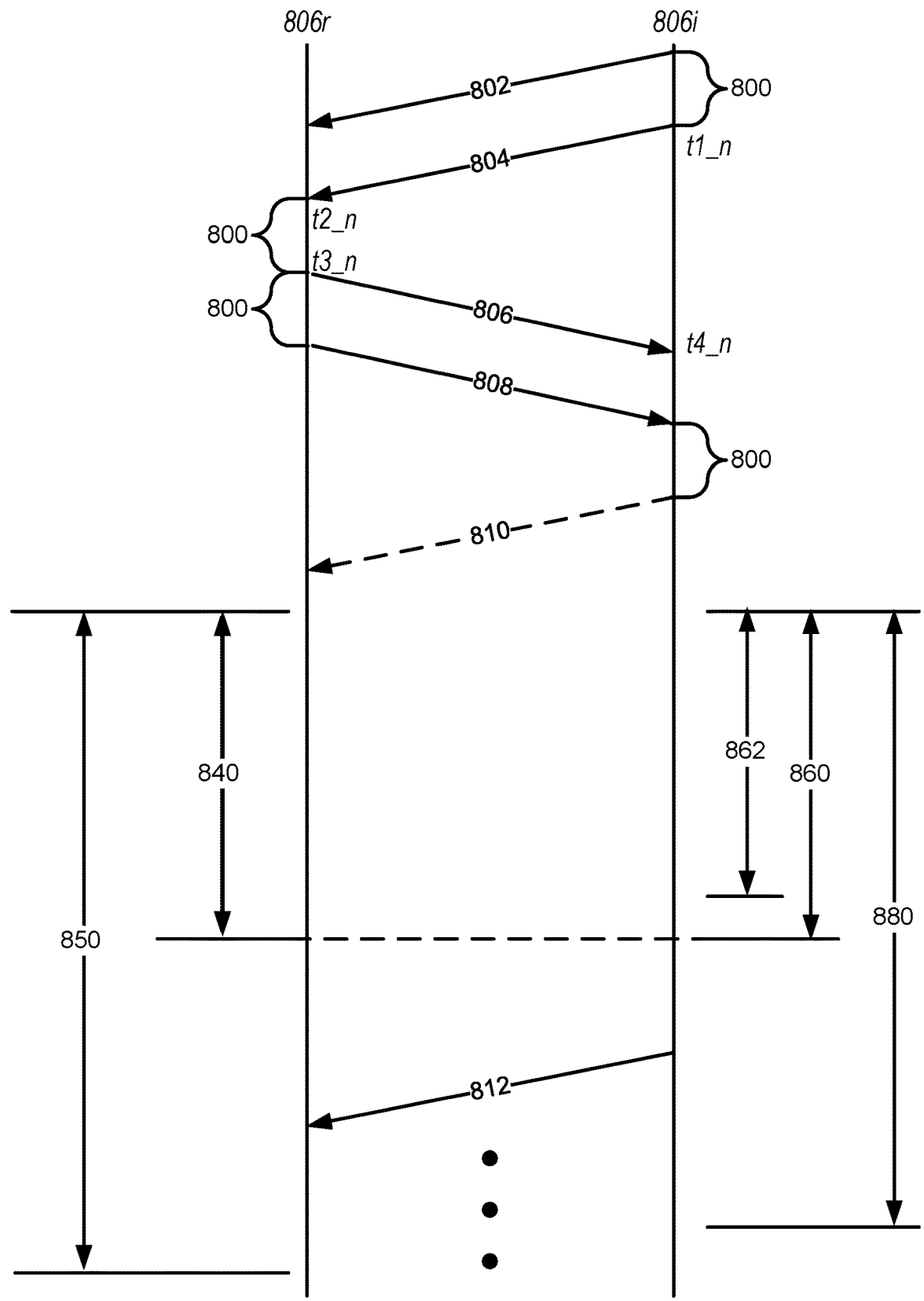
Figure 8C:
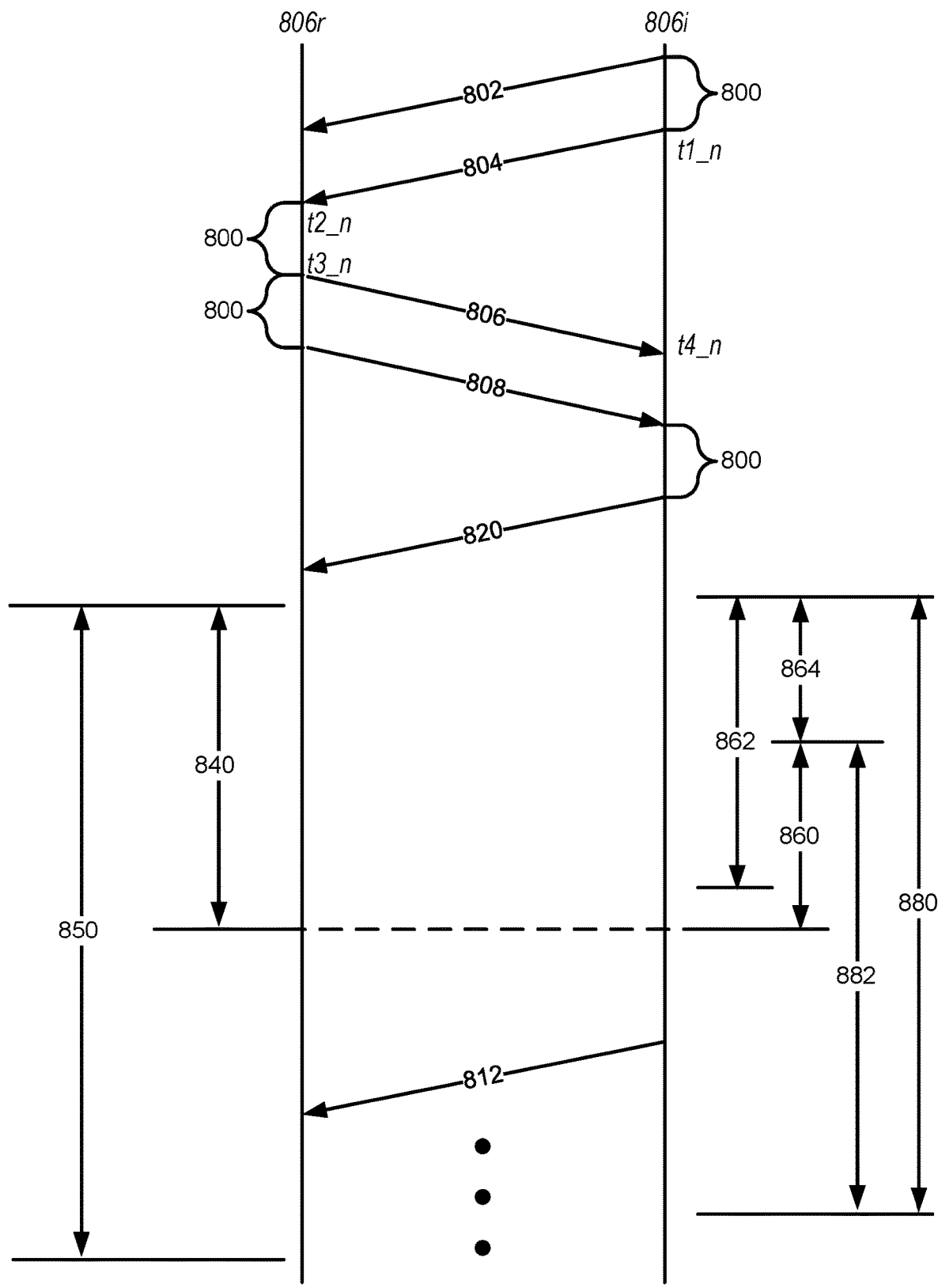
Figure 8D:
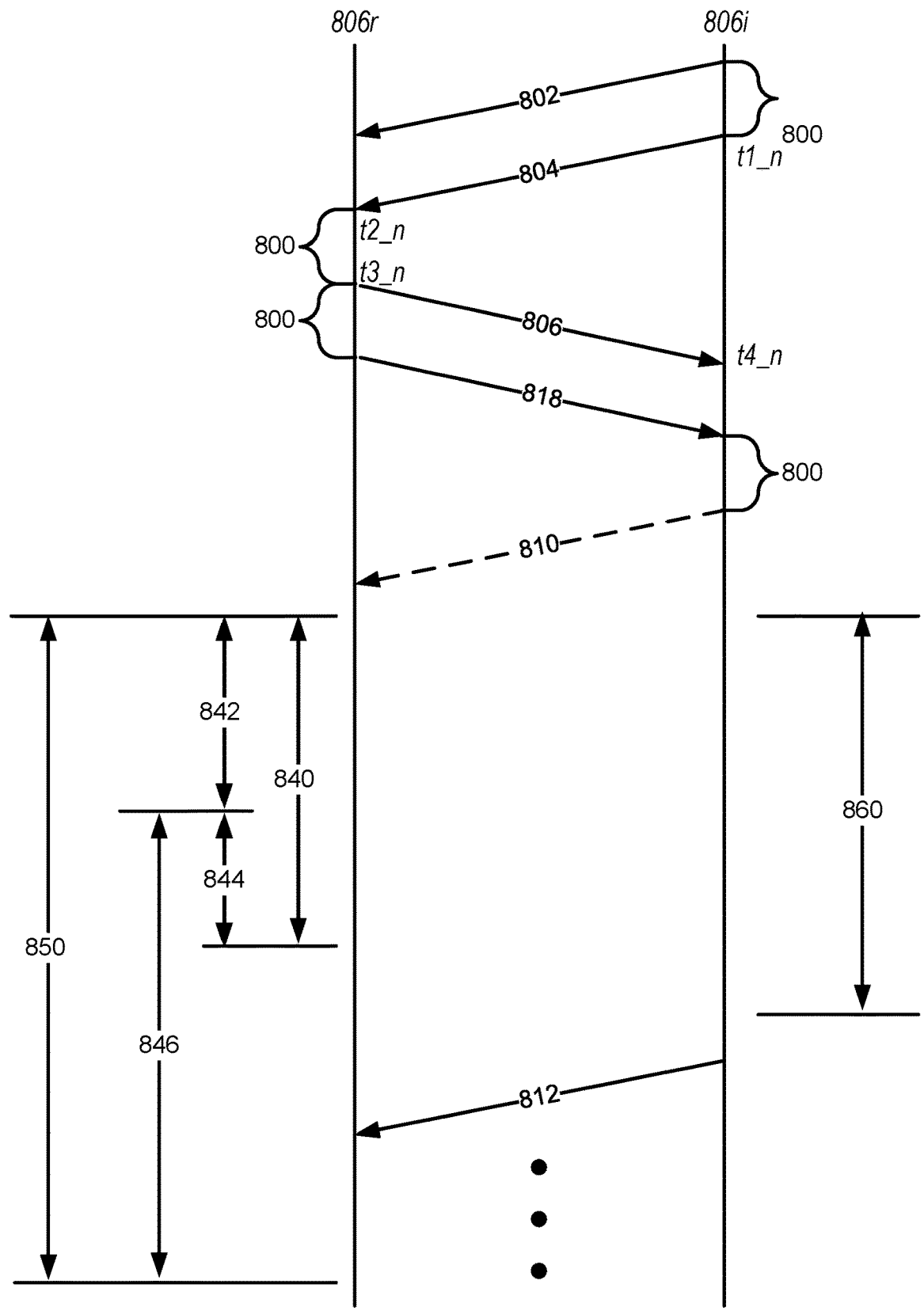
Figure 8E:
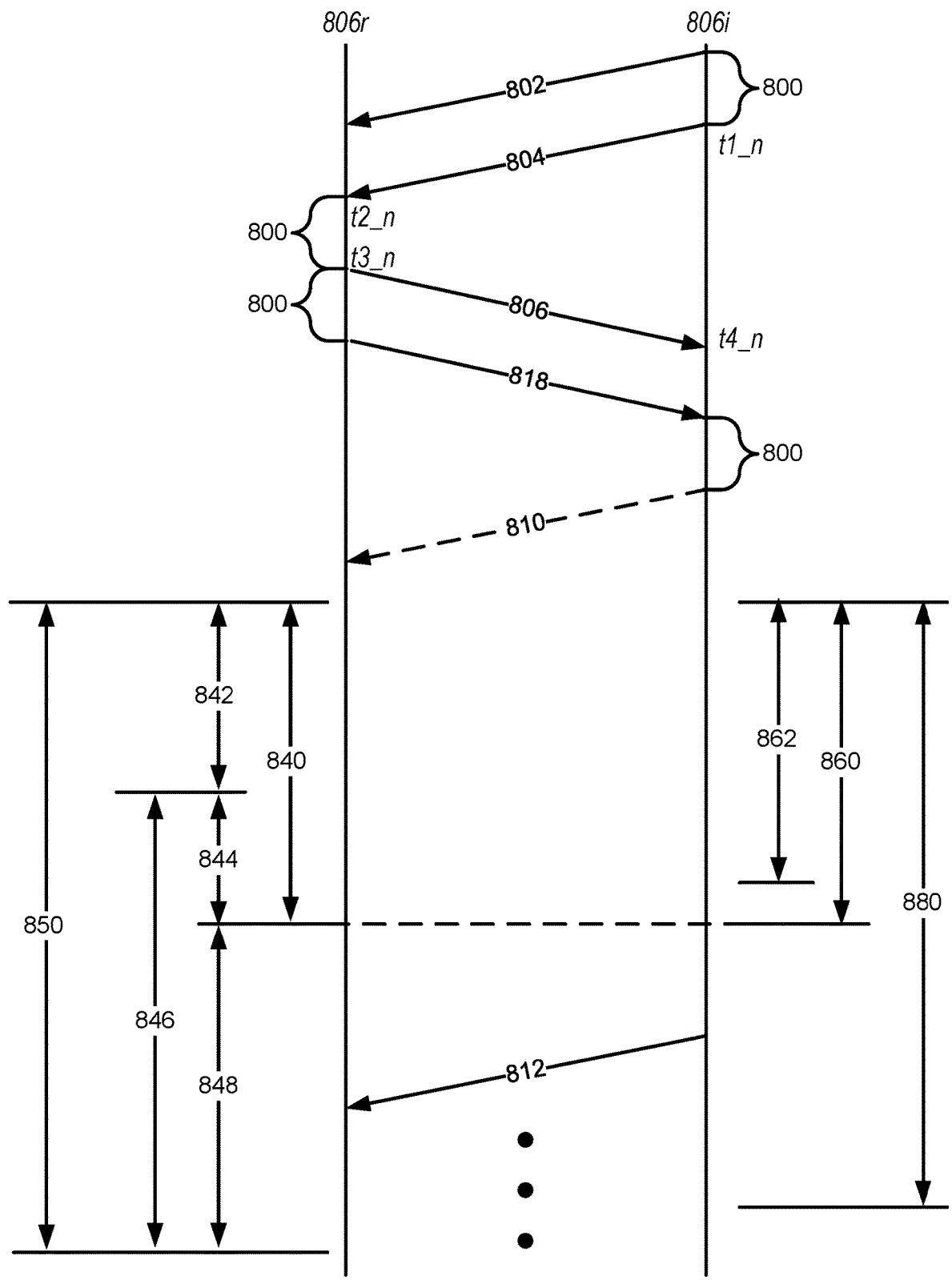
Figure 8F:
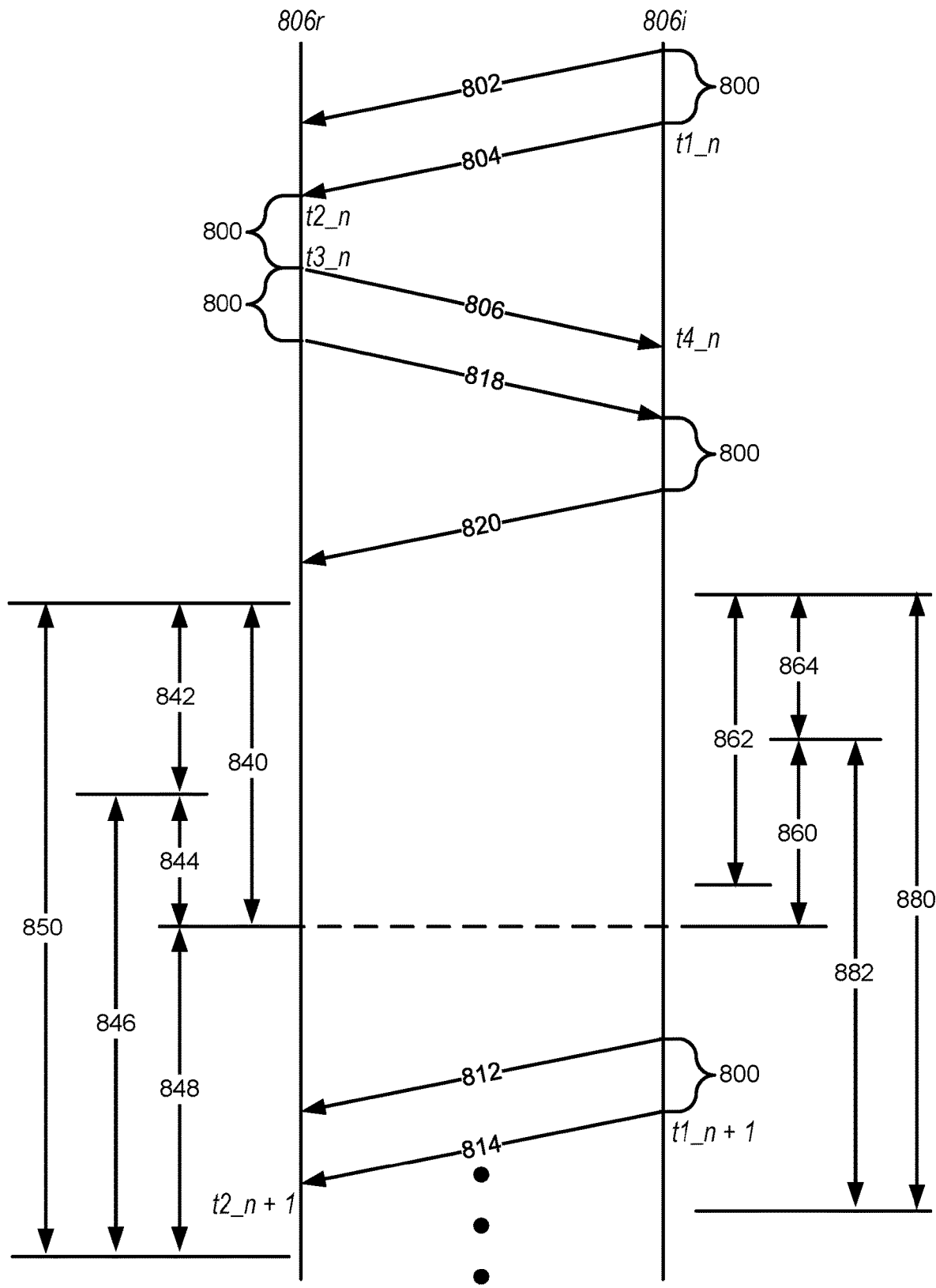

FIGS. 8A-8F illustrate examples of signaling for non-trigger-based ranging procedures, according to some embodiments. Note that the example illustrated by FIGS. 8A-8F assume a common reference start point for time intervals negotiated between the devices (e.g., MinTBM_r, MaxTBM_r, MinTBM_i, and MaxTBM_r). However, embodiments described herein are also applicable to instances in which there is not a common reference start point for the time intervals negotiated between the devices. FIGS. 8A-8C illustrate examples of signaling for a non-trigger-based ranging procedure that includes an immediate LMR transmitted from a responding station to an initiating station. FIGS. 8D-8F illustrate examples of signaling for a non-trigger-based ranging procedure that includes a delayed LMR transmitted from a responding station to an initiating station. The signaling performed in FIGS. 8A-8F may be performed subsequent to a negotiation in which one or more parameters (e.g., as described), are determined and/or exchanged between devices. Further, the signaling shown may be applied to any WLAN topology (e.g., non-trigger-based running over non-AP-station to non-AP-station or non-trigger-based running over AP to non-AP-station).

Turning to FIG. 8A, FIG. 8A illustrates a block diagram of an example of signaling for a non-trigger-based ranging procedure, according to some embodiments. The signaling shown in FIG. 8A may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806$i$ (which may be a device such as devices 106, 107, and/or 112 described above) and responding device 806$r$ (which may be a device such as devices 106, 107, and/or 112 described above) in which various parameters associated with a non-trigger-based ranging procedure may have been negotiated, initiating device 806$i$ may transmit a null data packet (NDP) announcement (NDPA) 802 to responding device 806$r$. After a short interframe space (SIFS) 800, device 806$i$ may transmit NDP 804 to responding device 806$r$ at time t1_n. Responding device 806$r$ may receive the NDP 804 at time t2_n. Additionally, after a SIFS 800, responding device 806$r$ may transmit NDP 806 to initiating device 806$i$ at time t3_n. Initiating device 806$i$ may receive NDP 806 at time t4_n. Further, after a SIFS 800 from time t3_n, responding device 806$r$ may transmit LMR 808 to initiating device 806$i$. LMR 808 may be considered an immediate LMR and may include timestamps associated with times t2_n and t3_n. Initiating device 806$i$ may then calculate a distance between the devices based on times t1_n, t2_n, t3_n, and t4_n, e.g., via equation (1). In addition, if negotiated, after a SIFS 800 subsequent to receiving LMR 808, initiating device 806$i$ may transmit LMR 810 to responding device 806$r$. LMR 810 may be considered an immediate LMR and may include timestamps associated with times t1_n and t4_n. Both devices may then calculate a distance between the devices based on times t1_n, t2_n, t3_n, and t4_n, e.g., via equation (1).

During the negotiation, responding device 806$r$ may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806$r$. In some embodiments, time period 840 may be specified via a MinTBM_r parameter. In some embodiments, time period 850 may be specified via a MaxTBM_r parameter. As shown, time period 850 may be greater than time period 840. In addition, upon expiration of the time period 850, if the responding device 806$r$ has not received an NDPA 812, the responding station 806$r$ may determine that a ranging session with the initiating station has timed out (expired).

In some embodiments, based on the time periods 840 and 850, the responding station may enter a power savings mode after completion of a current measurement round until the expiration of time period 840. In addition, based on the time period 840, the initiating station may enter a power savings mode for a time period 860 after completion of a current measurement round until initiating a subsequent round of measurement. The time period 860 may end at any time after expiration of the time period 840 and prior to expiration of the time period 850. In some embodiments, the initiating station 806$i$ may initiate a subsequent round of measurement by transmitting NDPA 812 as shown.

Turning to FIG. 8B, FIG. 8B illustrates a block diagram of another example of signaling for a non-trigger-based ranging procedure, according to some embodiments. The signaling shown in FIG. 8B may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806$i$ (which may be a device such as devices 106, 107, and/or 112 described above) and responding device 806$r$ (which may be a device such as devices 106, 107, and/or 112 described above) in which various parameters associated with a non-trigger-based ranging procedure may have been negotiated, initiating device 806$i$ may transmit a null data packet (NDP) announcement (NDPA) 802 to responding device 806*r*. After a short interframe space (SIFS) 800, device 806*i* may transmit NDP 804 to responding device 806*r* at time t1_n. Responding device 806*r* may receive the NDP 804 at time t2_n. Additionally, after a SIFS 800, responding device 806*r* may transmit NDP 806 to initiating device 806*i* at time t3_n. Initiating device 806*i* may receive NDP 806 at time t4_n. Further, after a SIFS 800 from time t3_n, responding device 806*r* may transmit LMR 808 to initiating device 806*i*. LMR 808 may be considered an immediate LMR and may include timestamps associated with times t2_n and t3_n. In addition, if negotiated, after a SIFS 800 subsequent to receiving LMR 808, initiating device 806*i* may transmit LMR 810 to responding device 806*r*. LMR 810 may be considered an immediate LMR and may include timestamps associated with times t1_n and t4_n. Both devices may then calculate a distance between the devices based on times t1_n, t2_n, t3_n, and t4_n, e.g., via equation (1).

During the negotiation, initiating device 806*i* may specify (and/or indicate) time periods 862 and 880. Time period 862 may specify (and/or indicate) the minimum time between measurement rounds required by the initiating device 806*i*. Time period 880 may specify (and/or indicate) the maximum time between measurement rounds required by the initiating device 806*i*. In some embodiments, time period 862 may be specified via a MinTBM_i parameter. In some embodiments, time period 880 may be specified via a MaxTBM_i parameter. In some embodiments, time period 862 and 880 may be based, at least in part, on one or more of power saving requirements, processing time requirements, and/or storage limitations of the initiating device 806*i*. In addition, responding device 806*r* may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806*r*. In some embodiments, time periods 840 and/or 850 may be further based, at least in part, on time periods 862 and 880 specified by the initiating device 806*i*. In some embodiments, time period 840 may be specified via a MinTBM_r parameter. In some embodiments, time period 850 may be specified via a MaxTBM_r parameter. As shown, time period 850 may be greater than time period 840. In addition, upon expiration of the time period 850, if the responding device 806*r* has not received the NDPA 812, the responding station 806*r* may determine that a ranging session with the initiating station has timed out (expired). Note that in some embodiments, time period 840 may be greater than or equal to time 862 and time period 850 may be less than or equal to time period 880.

In some embodiments, based on the time periods 840 and 850, the responding station may enter a power savings mode after completion of a current measurement round until the expiration of time period 840. In addition, based on the time period 840, the initiating station may enter a power savings mode for a time period 860 after completion of a current measurement round until initiating a subsequent round of measurement. The time period 860 may end at any time after expiration of the time period 840 and prior to expiration of the time period 850. In some embodiments, the initiating station 806*i* may initiate a subsequent round of measurement by transmitting NDPA 812 as shown.

Turning to FIG. 8C, FIG. 8C illustrates a block diagram of an example of signaling for a non-trigger-based ranging procedure that includes an immediate LMR transmitted from a responding station to an initiating station and a delayed LMR transmitted from the initiating station to the responding station, according to some embodiments. The signaling shown in FIG. 8C may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806*i* (which may be a device such as devices 106, 107, and/or 112 described above) and responding device 806*r* (which may be a device such as devices 106, 107, and/or 112 described above) in which various parameters associated with a non-trigger-based ranging procedure may have been negotiated, initiating device 806*i* may transmit a null data packet (NDP) announcement (NDPA) 802 to responding device 806*r*. After a short interframe space (SIFS) 800, device 806*i* may transmit NDP 804 to responding device 806*r* at time t1_n. Responding device 806*r* may receive the NDP 804 at time t2_n. Additionally, after a SIFS 800, responding device 806*r* may transmit NDP 806 to initiating device 806*i* at time t3_n. Initiating device 806*i* may receive NDP 806 at time t4_n. Further, after a SIFS 800 from time t3_n, responding device 806*r* may transmit LMR 808 to initiating device 806*i*. LMR 808 may be considered an immediate LMR and may include timestamps associated with times t2_n and t3_n. In addition, after a SIFS 806 subsequent to receiving LMR 808, initiating device 806*i* may transmit LMR 820 to responding device 806*r*. LMR 820 may be considered a delayed LMR and may include timestamps associated with times t1_n−1 and t4_n−1. Responding device 806*r* may calculate the distance between the devices based on times t1_n−1, t2_n−1, t3_n−1, and t4_n−1, e.g., via equation (1). Initiating device 806*i* may calculate the distance between the devices based on times t1_n, t2_n, t3_n, and t4_n, e.g., via equation (1).

During the negotiation, initiating device 806*i* may specify (and/or indicate) time periods 862 and 880. Time period 862 may specify (and/or indicate) a minimum time between measurement rounds and time period 880 may specify (and/or indicate) a maximum time between measurement rounds. In some embodiments, time period 862 may be specified via a MinTBM_i parameter. In some embodiments, time period 880 may be specified via a MaxTBM_i parameter. In some embodiments, time period 862 and 880 may be based, at least in part, on one or more of power saving requirements, processing time requirements, and/or storage limitations of the initiating device 806*i*. In some embodiments, time period 862 is greater or equal to initiating device 806*i*'s time stamp processing time 864. In some embodiments, the period 880 is less than or equal to the time that the initiating device 806*i* stores the timestamps transmitted in a delayed LMR. In addition, responding device 806*r* may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806*r*. In some embodiments, time periods 840 and/or 850 may be further based, at least in part, on time periods 862 and 880 specified by the initiating device 806*i*. In some embodiments, time period 840 may be specified via a MinTBM_r parameter. In some embodiments, time period 850 may be specified via a MaxTBM_r parameter. As shown, time period 850 may be greater than time period 840. In addition, upon expiration of the time period 850, if the responding device 806r has not received the NDPA 812, the responding station 806r may determine that a ranging session with the initiating station has timed out (expired). Similarly, in some embodiments, time period 862 may be greater than a processing time 864 of the initiating device. In addition, an LMR including timestamps associated with times t1_n and t4_n may be stored for the time period 882. Note that in some embodiments, time period 850 may be less than or equal to time period 880, and time period 840 maybe greater or equal to the time period 862.

In some embodiments, based on the time periods 840 and 850, the responding station may enter a power savings mode after completion of a current measurement round until the expiration of time period 840. In addition, based on the time period 840, the initiating station may enter a power savings mode for a time period 860 after completion of processing of data (e.g., processing time 864) of a current measurement round until initiating a subsequent round of measurement. The time period 860 may end at any time after expiration of the time period 840 and prior to expiration of the time period 850. In some embodiments, the initiating station 806i may initiate a subsequent round of measurement by transmitting NDPA 812 as shown.

Turning to FIG. 8D, FIG. 8D illustrates a block diagram of a further example, according to some embodiments. The signaling shown in FIG. 8D may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806i (which may be a device such as devices 106, 107, and/or 112 described above) and responding device 806r (which may be a device such as devices 106, 107, and/or 112 described above) in which various parameters associated with a non-trigger-based ranging procedure may have been negotiated, initiating device 806i may transmit a null data packet (NDP) announcement (NDPA) 802 to responding device 806r. After a short interframe space (SIFS) 800, device 806i may transmit NDP 804 to responding device 806r at time t1_n. Responding device 806r may receive the NDP 804 at time t2_n. Additionally, after a SIFS 800, responding device 806r may transmit NDP 806 to initiating device 806i at time t3_n. Initiating device 806i may receive NDP 806 at time t4_n. Further, after a SIFS 800 from time t3_n, responding device 806r may transmit LMR 808 to initiating device 806i. LMR 818 may be considered a delayed LMR and may include timestamps associated with times t2_n−1 and t3_n−1. Initiating device 806i may then calculate a distance between the devices based on times t1_n−1, t2_n−1, t3_n−1, and t4_n−1, e.g., via equation (1). In addition, if negotiated, after a SIFS 800 subsequent to receiving LMR 818, initiating device 806i may transmit LMR 810 to responding device 806r. LMR 810 may be considered an immediate LMR and may include timestamps associated with times t1_n and t4_n. Both devices may then calculate a distance between the devices based on times t1_n, t2_n, t3_n, and t4_n, e.g., via equation (1).

During the negotiation, responding device 806r may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806r. In some embodiments, time period 840 may be specified via a MinTBM_r parameter. In some embodiments, time period 850 may be specified via a MaxTBM_r parameter. Note that time period 840 may be greater than or equal to processing time period 842. Note further that time period 850 may be less or equal to the maximal timestamps storage time at responding device 806r. As shown, time period 850 may be greater than time period 840. In addition, upon expiration of the time period 850, if responding device 806r has not received NDPA 812, the responding station 806r may determine that a ranging session with the initiating station has timed out (expired).

In some embodiments, based on the time periods 840 and 850, the responding station may enter a power savings mode after completion of processing of data for a current measurement round (e.g., time period 842) until the expiration of time period 840 (e.g., time period 844). Note that an LMR that includes timestamps associated with times t2_n and t3_n may be stored for a time period 846. In addition, based on the time period 840, the initiating station may enter a power savings mode for a time period 860 after completion of a current measurement round until initiating a subsequent round of measurement. The time period 860 may end at any time after expiration of the time period 840 and prior to expiration of the time period 850. In some embodiments, the initiating station 806i may initiate a subsequent round of measurement by transmitting NDPA 812 as shown.

Turning to FIG. 8E, FIG. 8E illustrates a block diagram of an additional example of signaling for a non-trigger-based ranging procedure that includes a delayed LMR transmitted from a responding station to an initiating station, according to some embodiments. The signaling shown in FIG. 8E may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806i (which may be a device such as devices 106, 107, and/or 112 described above) and responding device 806r (which may be a device such as devices 106, 107, and/or 112 described above) in which various parameters associated with a non-trigger-based ranging procedure may have been negotiated, initiating device 806i may transmit a null data packet (NDP) announcement (NDPA) 802 to responding device 806r. After a short interframe space (SIFS) 800, device 806i may transmit NDP 804 to responding device 806r at time t1_n. Responding device 806r may receive the NDP 804 at time t2_n. Additionally, after a SIFS 800, responding device 806r may transmit NDP 806 to initiating device 806i at time t3_n. Initiating device 806i may receive NDP 806 at time t4_n. Further, after a SIFS 800 from time t3_n, responding device 806r may transmit LMR 808 to initiating device 806i. LMR 818 may be considered a delayed LMR and may include timestamps associated with times t2_n−1 and t3_n−1. Responding device 806r may then calculate a distance between the devices based on times t1_n−1, t2_n−1, t3_n−1, and t4n−1, e.g., via equation (1). In addition, if negotiated, after a SIFS 800 subsequent to receiving LMR 818, initiating device 806i may transmit LMR 810 to responding device 806r. LMR 810 may be considered an immediate LMR and may include timestamps associated with times t1_n and t4n. Initiating device 806i may then calculate a distance between the devices based on times t1 n, t2n, t3_n, and t4_n, e.g., via equation (1).

During the negotiation, initiating device 806i may specify (and/or indicate) time periods 862 and 880. Time period 862 may specify (and/or indicate) the minimum time between measurement rounds required by the initiating device 806i. Time period 880 may specify (and/or indicate) the maximum time between measurements rounds required by the initiating device 806i. In some embodiments, time period 862 may be specified via a MinTBM_i parameter. In some embodiments, time period 880 may be specified via a MaxTBM_i parameter. In some embodiments, time period 862 and 880 may be based, at least in part, on one or more of power saving requirements, processing time requirements, and/or storage limitations of the initiating device 806i. In addition, responding device 806r may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806r. In some embodiments, time periods 840 and/or 850 may be further based, at least in part, on time periods 862 and 880 specified by the initiating device 806i. In some embodiments, time period 840 may be specified via a MinTBM_r parameter. In some embodiments, time period 850 may be specified via a MaxTBM_r parameter. As shown, time period 850 may be greater than time period 840. In addition, upon expiration of the time period 850, if responding device 806r has not received NDPA 812, the responding station 806r may determine that a ranging session with the initiating station has timed out (expired). Note that in some embodiments, time period 840 may be greater than or equal to responding device 806i's timestamp processing time 842, and less to time period time period 880. Note further that in some embodiments, time period 840 is greater or equal to time period 862. In addition, time period 850 may greater than time period 862, but less than or equal to responding device 806r's timestamp storage time.

In some embodiments, based on the time periods 840 and 850, the responding station may enter a power savings mode after completion of processing of data for a current measurement round (e.g., time period 842) until the expiration of time period 840 (e.g., time period 844). Note that an LMR that includes timestamps associated with times t2_n and t3_n may be stored for a time period 846. In addition, based on the time period 840, initiating device 806i may enter a power savings mode for a time period 860 after completion of a current measurement round until initiating a subsequent round of measurement. The time period 860 may end at any time after expiration of the time period 840 and prior to expiration of the time period 850. In some embodiments, the initiating station 806i may initiate a subsequent round of measurement by transmitting NDPA 812 as shown.

Turning to FIG. 8F, FIG. 8F illustrates a block diagram of an example of signaling for a non-trigger-based ranging procedure that includes a delayed LMR transmitted from a responding station to an initiating station and a delayed LMR transmitted from the initiating station to the responding station, according to some embodiments. The signaling shown in FIG. 8F may be used in conjunction with any of the systems or devices shown in the above Figures, among other devices. In various embodiments, some of the signaling elements shown may be performed concurrently, in a different order than shown, or may be omitted. Additional signaling may also be performed as desired. As shown, signaling may flow as follows.

Subsequent to a negotiation between an initiating device 806i (which may be a device such as devices 106, 107, and/or 112 described above) and responding device 806r (which may be a device such as devices 106, 107, and/or 112 described above) in which various parameters associated with a non-trigger-based ranging procedure may have been negotiated, initiating device 806i may transmit a null data packet (NDP) announcement (NDPA) 802 to responding device 806r. After a short interframe space (SIFS) 800, device 806i may transmit NDP 804 to responding device 806r at time t1_n. Responding device 806r may receive the NDP 804 at time t2_n. Additionally, after a SIFS 800, responding device 806r may transmit NDP 806 to initiating device 806i at time t3_n. Initiating device 806i may receive NDP 806 at time t4_n. Further, after a SIFS 800 from time t3_n, responding device 806r may transmit LMR 808 to initiating device 806i. LMR 818 may be considered a delayed LMR and may include timestamps associated with times t2_n−1 and t3_n−1. In addition, after a SIFS 806 subsequent to receiving LMR 818, initiating device 806i may transmit LMR 820 to responding device 806r. LMR 820 may be considered a delayed LMR and may include timestamps associated with times t1_n−1 and t4_n−1. Responding device 806r may calculate the distance between the devices based on times t1_n−1, t2_n−1, t3_n−1, and t4_n−1, e.g., via equation (1). Initiating device 806i may calculate the distance between the devices based on times t1 n−1, t2 n−1, t3 n−1, and t4 n−1, e.g., via equation (1).

During the negotiation, initiating device 806i may specify (and/or indicate) time periods 862 and 880. Time period 862 may specify (and/or indicate) the minimum time between measurement rounds required by the initiating device 806i. Time period 880 may specify (and/or indicate) the maximum time between measurements rounds required by the initiating device 806i. In some embodiments, time period 862 may be specified via a MinTBM_i parameter. In some embodiments, time period 880 may be specified via a MaxTBM_i parameter. In some embodiments, time period 862 and 880 may be based, at least in part, on one or more of power saving requirements, processing time requirements, and/or storage limitations of the initiating device 806i. In addition, responding device 806r may specify (and/or indicate) time periods 840 and 850. Time period 840 may specify (and/or indicate) a minimum time between measurement rounds and time period 850 may specify (and/or indicate) a maximum time between measurement rounds. In some embodiments, time periods 840 and/or 850 may be based, at least in part, on one or more of power saving requirements, processing time requirements, and/or storage limitations of the responding device 806r. In some embodiments, time periods 840 and/or 850 may be further based, at least in part, on time periods 862 and 880 specified by the initiating device 806i. In some embodiments, time period 840 may be specified via a MinTBM_r parameter. In some embodiments, time period 850 may be specified via a MaxTBM_r parameter. As shown, time period 862 may be greater or equal to initiating device 806i's timestamp processing time 864, time period 880 may be less than or equal to initiating device 806i's timestamp storage time. Note further in some embodiments, time period 840 may be greater or equal to responding device 806r's processing time 842, time period 840 may be less than time period 880, time period 840 may be greater or equal to time period 862. In addition, time period 850 may be greater than time period 840 and greater than time period 862, but less than or equal to responding device 806r's timestamp storage time. In addition, upon expiration of the time period 850, if responding device 806r has not received NDPA 812, the responding station 806r may determine that a ranging session with the initiating station has timed out (expired). Further, an LMR including timestamps associated with times t1_n and t4_n may be stored for the time period 882.

In some embodiments, based on the time periods 840 and 850, the responding station may enter a power savings mode after completion of processing of data for a current measurement round (e.g., time period 842) until the expiration of time period 840 (e.g., time period 844). In addition, based on the time period 840, the initiating station may enter a power savings mode for a time period 860 after completion of processing of data (e.g., processing time 864) of a current measurement round until initiating a subsequent round of measurement. The time period 860 may end at any time after expiration of the time period 840 and prior to expiration of the time period 850. In some embodiments, the initiating station 806i may initiate a subsequent round of measurement by transmitting NDPA 812 as shown.

Figure 9:
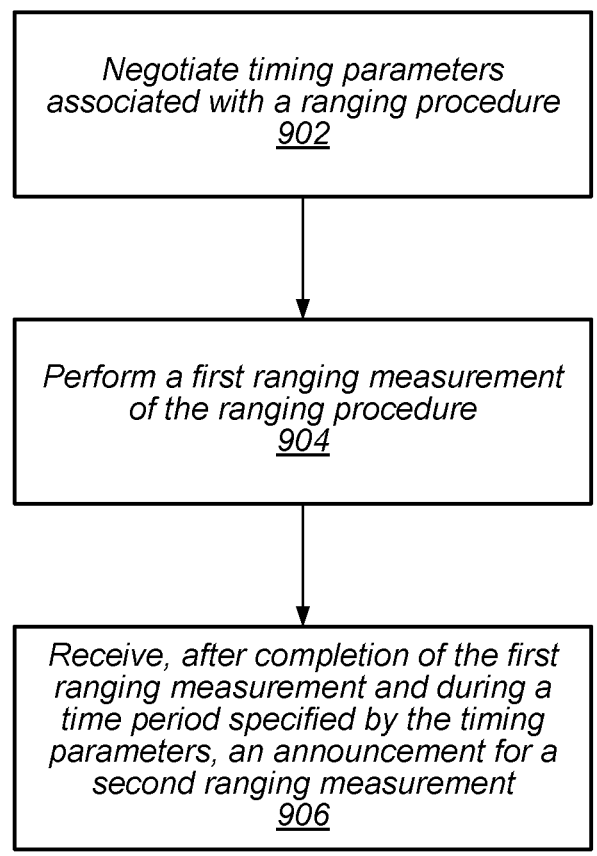
FIG. 9 illustrates a block diagram of an example of a method for performing a ranging procedure, according to some embodiments.

FIG. 9 illustrates a block diagram of an example of a method for performing a ranging procedure, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, timing parameters associated with a ranging procedure may be negotiated. In some embodiments, the ranging procedure may be performed according to the non-trigger-based ranging protocol. In some embodiments, the negotiation may be initiated by a neighboring wireless device (e.g., such as initiating station 806i). In some embodiments, the timing parameters may specify a time range (e.g., indicate a time window) in which an initiating device may initiate a subsequent ranging procedure. In some embodiments, a first parameter may specify (and/or indicate) a responding device's (required) minimum time between ranging measurements. In other words, the first parameter may specify (and/or indicate) a minimum amount of time a responding device requires an initiating device to wait prior to starting another ranging measurement. In some embodiments, a second parameter may specify (and/or indicate) a responding device's (required) maximum time between ranging measurements. In other words, the second parameter may specify (and/or indicate) a maximum amount of time an initiating device can wait prior to starting another ranging measurement. In some embodiments, if an initiating station has not initiating another ranging measurement prior to expiration of the maximum time, a responding station may abort (and/or cancel) the ranging procedure. In some embodiments, a third parameter may specify (and/or indicate) an initiating device's (required) minimum time between ranging measurements. In other words, the third parameter a minimum amount of time an initiating device requires prior to starting another ranging measurement. In some embodiments, a fourth parameter may specify (and/or indicate) an initiating device's (required) maximum time between ranging measurements. In other words, the fourth parameter may specify (and/or indicate) a maximum amount of time an initiating device can wait prior to starting another ranging measurement. In some embodiments, the first parameter may be based, at least in part, on the third parameter and/or the fourth parameter. In some embodiments, the first parameter may also be based on the device's timestamp processing time. In some embodiments, the second parameter may be based, at least in part, on the third parameter and/or fourth parameter. In some embodiments, the second parameter may also be based on a timestamp storage time of the wireless device.

At 904, a first ranging measurement of the ranging procedure may be performed. In some embodiments, performing the first ranging measurement may include receiving an announcement for the first ranging measurement from a neighboring wireless device, receiving a first measurement packet from the neighboring wireless device at a first time, and transmitting a second measurement packet to the neighboring wireless device at a second time. In addition, at a third time, a report associated with the ranging procedure may be transmitted to the neighboring wireless device. In some embodiments, the report may be considered an immediate report and may include timestamps associated with the first time and second time. In some embodiments, the report may be considered a delayed report and may include timestamps associated with a prior ranging measurement. In some embodiments, the report may be an LMR. In some embodiments, the announcement may be a null data packet announcement (NDPA) and the first and second measurement packets may be null data packets (NDPs). In some embodiments, the first time and second time may be separated by a short interframe space (SIFS) and the second time and the third time may be separated by a SIFS.

In some embodiments, a report may be received from the neighboring wireless device at a fourth time. The report may be associated with the ranging procedure. In some embodiments, the report may be considered an immediate report and include timestamps associated with the transmission of the first measurement packet and reception of the second measurement packet by the neighboring wireless device. In some embodiments, the report may be considered a delayed report and may include timestamps associated with transmission of a prior first measurement packet and reception of a prior second measurement packet by the neighboring wireless device. In some embodiments, a distance to the neighboring wireless device may be calculated based, at least in part, on the report received from the neighboring wireless device, the first time, and the second time.

At 906, after completion of the first ranging procedure and during a time period specified by the timing parameters, an announcement for a second ranging measurement may be received. In some embodiments, after completion of the first ranging measurement, a power savings mode may be entered for at least a first time period. In some embodiments, the first time period may be based, at least in part, on the timing parameters. In some embodiments, the first time period may be further based, at least in part, on a processing time associated with the first ranging measurement.

Figure 10:
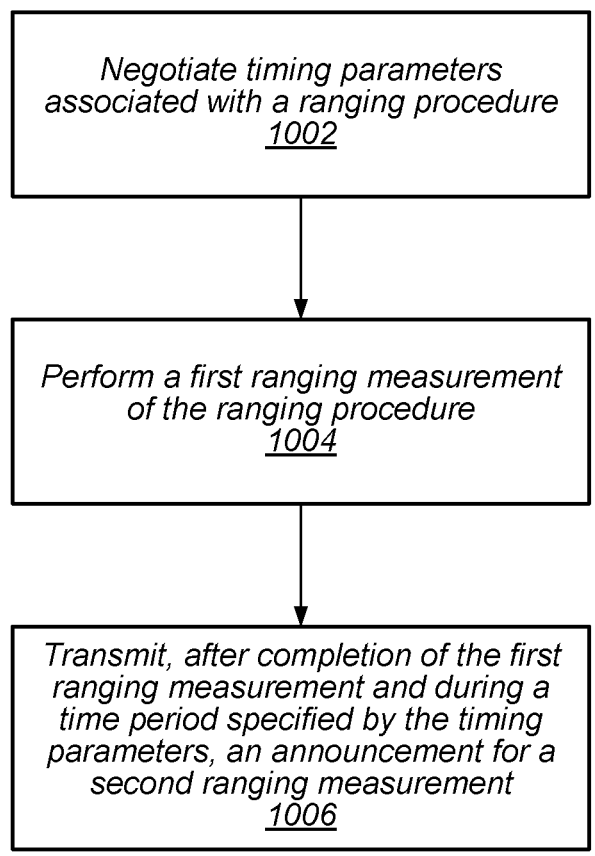
FIG. 10 illustrates a block diagram of another example of a method for performing a ranging procedure, according to some embodiments.

FIG. 10 illustrates a block diagram of another example of a method for performing a ranging procedure, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, timing parameters associated with a ranging procedure may be negotiated. In some embodiments, the ranging procedure may be performed according to the non-trigger-based ranging protocol. In some embodiments, the negotiation may be initiated by a wireless device (e.g., such as initiating station 806*i*). In some embodiments, the timing parameters may specify (and/or indicate) a time range (e.g., a time window and/or time duration) in which an initiating device may initiate a subsequent ranging procedure. In some embodiments, a first parameter may specify (and/or indicate) a responding device's (required) minimum time between ranging measurements. In other words, the first parameter may specify (and/or indicate) a minimum amount of time a responding device requires an initiating device to wait prior to starting another ranging measurement. In some embodiments, a second parameter may specify (and/or indicate) a responding device's (required) maximum time between ranging measurements. In other words, the second parameter may specify (and/or indicate) a maximum amount of time an initiating device can wait prior to starting another ranging measurement. In some embodiments, if an initiating station has not initiating another ranging measurement prior to expiration of the maximum time, a responding station may abort (and/or cancel) the ranging procedure. In some embodiments, a third parameter may specify (and/or indicate) an initiating device's (required) minimum time between ranging measurements. In other words, the third parameter specifies a minimum amount of time an initiating device requires prior to starting another ranging measurement. In some embodiments, a fourth parameter may specify (and/or indicate) an initiating device's (required) maximum time between ranging measurements. In other words, the fourth parameter may specify (and/or indicate) a maximum amount of time an initiating device can wait prior to starting another ranging measurement. In some embodiments, the first parameter may be based, at least in part, on the third parameter and/or fourth parameter. In some embodiments, the second parameter may be based, at least in part, on the third parameter and/or fourth parameter.

At 1004, a first ranging measurement of the ranging procedure may be performed. In some embodiments, performing the first ranging measurement may include transmitting an announcement for the first ranging measurement to a neighboring wireless device, transmitting a first measurement packet to the neighboring wireless device at a first time, and receiving a second measurement packet from the neighboring wireless device at a second time. In addition, at a third time, a report associated with the ranging procedure may be received from the neighboring wireless device. In some embodiments, the report may be considered an immediate report and may include timestamps associated with receipt of the first measurement packet and transmission of the second measurement packet. In some embodiments, the report may be considered a delayed report and may include timestamps associated with a prior ranging measurement. In some embodiments, the report may be an LMR. In some embodiments, the announcement may be a null data packet announcement (NDPA) and the first and second measurement packets may be null data packets (NDPs). In some embodiments, transmission of the announcement and transmission of the first measurement packet may be separated by a short interframe space (SIFS). In some embodiments, a distance to the neighboring wireless device may be calculated based, at least in part, on the report received from the neighboring wireless device, the first time, and the second time.

In some embodiments, a report may be transmitted to the neighboring wireless device at a fourth time. The report may be associated with the ranging procedure. In some embodiments, the report may be considered an immediate report and include timestamps associated with transmission of the first measurement packet and reception of the second measurement packet. In some embodiments, the report may be considered a delayed report and may include timestamps associated with transmission of a prior first measurement packet and reception of a prior measurement packet.

At 1006, after completion of the first ranging procedure and during a time period specified by the timing parameters, an announcement for a second ranging measurement may be transmitted. In some embodiments, after completion of the first ranging measurement, a power savings mode may be entered for at least a first time period. In some embodiments, the first time period may be based, at least in part, on the timing parameters. In some embodiments, the first time period may be further based, at least in part, on a processing time associated with the first ranging measurement.

Further Embodiments

In some embodiments, a wireless device may include at least one antenna and at least one radio communicatively coupled to the antenna. The at least one radio may be configured to perform wireless communications according to at least one radio access technology (RAT). The wireless device may additionally include at least one processor communicatively coupled to the at least one radio, wherein the wireless device may be configured to perform voice and/or data communications. The at least one processor may be configured to cause the wireless device to perform a method according to the embodiments described herein.

For example, in some embodiments, the wireless device may be configured to perform a method including:

negotiating one or more timing parameters associated with a ranging procedure, wherein the one or more timing parameters may specify (and/or indicate) a time range (and/or time window) in which an initiating device can initiate a subsequent ranging measurement;

performing a first ranging measurement of the ranging procedure;

receiving, after completion of the first ranging measurement, a message announcing initiation of a second ranging measurement of the ranging procedure, wherein the message may be received during the time range specified by the one or more timing parameters.

In some embodiments, a first parameter of the one or more timing parameters may specify (and/or indicate) a responding device's (required) minimum time between ranging measurements and a second parameter of the one or more timing parameters may specify (and/or indicate) a responding device's (required) maximum time between ranging measurements. In some embodiments, a third parameter of the one or more timing parameters may specify (and/or indicate) an initiating device's (required) minimum time between ranging measurements and a fourth parameter of the one or more timing parameters may specify (and/or indicate) an initiating device's (required) maximum time between ranging measurements. In some embodiments, the first and/or second parameters may be based, at least in part, on one or both of the third and fourth parameters.

In some embodiments, the wireless device may be further configured to perform the method including entering, after completion of the first ranging measurement, a power saving mode for a first time period, wherein the first time period is based, at least in part, on the one or more timing parameters. In some embodiments, the first time period may be further based, at least in part, on a processing time associated with the first ranging measurement.

In some embodiments, performance of the first ranging measurement of the ranging procedure may include:

receiving an announcement from a neighboring wireless device, wherein the announcement may indicate initiation of the first ranging measurement;

receiving at a first time, a first measurement packet from the neighboring wireless device;

transmitting, at a second time, a second measurement packet to the neighboring wireless device; and transmitting, at a third time, a report to the neighboring wireless device, wherein the report may be associated with the ranging procedure.

In some embodiments, the report may include timestamps associated with the first time and second time. In some embodiments, the report may include timestamps associated with a prior ranging measurement. In some embodiments, the first time and second time may be separated by a short interframe space and the second time and the third time may be separated by a short interframe space. In some embodiments, the wireless device may be further configured to perform the method including receiving, at a fourth time, a report from the neighboring wireless device, wherein the report may be associated with the ranging procedure. In some embodiments, the report may include timestamps associated with the transmission of the first measurement packet and reception of the second measurement packet by the neighboring wireless device. In some embodiments, the report may include timestamps associated with transmission of a prior first measurement packet and reception of a prior second measurement packet by the neighboring wireless device. In some embodiments, the wireless device may be further configured to perform the method including calculating a distance between the wireless device and the neighboring wireless device based, at least in part, on the report received from the neighboring wireless device, the first time, and the second time. In some embodiments, the first measurement packet may be a null data packet (NDP) and the second measurement packet may be an NDP.

In some embodiments, the announcement may be a null data packet announcement (NDPA).

In some embodiments, the neighboring wireless device may be one of a client station or an access point.

In some embodiments, the one or more timing parameters may be based, at least in part, on one or more of:
  processing requirements of the wireless device;
  processing limitations of the wireless device;
  storage requirements of the wireless device;
  storage limitations of the wireless device;
  power limitations of the wireless device; and/or
  power saving requirements of the wireless device.

In some embodiments, the one or more timing parameters may be based, at least in part, on one or more of:
  processing requirements of the neighboring wireless device;
  processing limitations of the neighboring wireless device;
  storage requirements of the neighboring wireless device;
  storage limitations of the neighboring wireless device;
  power limitations of the neighboring wireless device; and/or
  power saving requirements of the neighboring wireless device.

In some embodiments, an apparatus (e.g., comprised or included in the wireless device) may be configured to perform the method described above. In some embodiments, the apparatus may include a memory and at least one processor in communication with the memory.

In some embodiments, a non-transitory computer readable memory medium storing program instructions executable by a processor (and/or processing circuitry) of the wireless device may be configured to perform the method described above.

As another example, the wireless device may be configured to perform a method a ranging procedure comprising one or more ranging measurements, including:

negotiating one or more timing parameters associated with the ranging procedure, wherein the one or more timing parameters may specify a time range (e.g., indicate a time window) in which an initiating device can initiate a subsequent ranging measurement;

performing a first ranging measurement of the ranging procedure;

transmitting, after completion of the first ranging measurement, a message announcing initiation of a second ranging measurement of the ranging procedure, wherein the message may be received during the time range specified by the one or more timing parameters.

In some embodiments, a first parameter of the one or more timing parameters may specify (and/or indicate) a responding device's (required) minimum time between ranging measurements and a second parameter of the one or more timing parameters may specify (and/or indicate) a responding device's (required) maximum time between ranging measurements. In some embodiments, a third parameter of the one or more timing parameters may specify (and/or indicate) an initiating device's (required) minimum time between ranging measurements and a fourth parameter of the one or more timing parameters may specify (and/or indicate) an initiating device's (required) maximum time between ranging measurements. In some embodiments, the first and/or second parameters may be based, at least in part, on one or both of the third and fourth parameters.

In some embodiments, the wireless device may be further configured to perform the method including entering, after completion of the first ranging measurement, a power saving mode for a first time period, wherein the first time period may be based, at least in part, on the one or more timing parameters. In some embodiments, the first time period may be further based, at least in part, on a processing time associated with the first ranging measurement.

In some embodiments, performing the first ranging measurement of the ranging procedure may including:

transmitting an announcement to a neighboring wireless device, wherein the announcement may indicate initiation of the first ranging measurement;

transmitting at a first time, a first measurement packet to the neighboring wireless device;

receiving, at a second time, a second measurement packet from the neighboring wireless device;

receiving, at a third time, a report from the neighboring wireless device, wherein the report may be associated with the ranging procedure; and calculating, based, at least in part, on the first time, the second time, and the report, a distance between the wireless device and the neighboring wireless device.

In some embodiments, the report may include timestamps associated with the reception of the first measurement packet and transmission of the second measurement packet by the neighboring wireless device. In some embodiments, the report may include timestamps associated with reception of a prior first measurement packet and transmission of a prior second measurement packet by the neighboring wireless device. In some embodiments, transmitting the announcement and transmitting the first measurement packet may be separated by a short interframe space. In some embodiments, the wireless device may be further configured to perform the method including transmitting, at a fourth time, a report to the neighboring wireless device, wherein the report may be associated with the ranging procedure. In some embodiments, the report may include timestamps associated with the transmission of the first measurement packet and reception of the second measurement packet. In some embodiments, the report may include timestamps associated with transmission of a prior first measurement packet and reception of a prior second measurement packet. In some embodiments, the first measurement packet may be a null data packet (NDP) and the second measurement packet may be an NDP.

In some embodiments, the announcement may be a null data packet announcement (NDPA).

In some embodiments, the wireless device may comprise (and/or be) one of a client station or an access point.

In some embodiments, the one or more timing parameters may be based, at least in part, on one or more of:
processing requirements of the neighboring wireless device;
processing limitations of the neighboring wireless device;
storage requirements of the neighboring wireless device;
storage limitations of the neighboring wireless device;
power limitations of the neighboring wireless device; and/or
power saving requirements of the neighboring wireless device.

In some embodiments, the one or more timing parameters may be based, at least in part, one or more of:
processing requirements of the wireless device;
processing limitations of the wireless device;
storage requirements of the wireless device;
storage limitations of the wireless device;
power limitations of the wireless device; or
power saving requirements of the wireless device.

In some embodiments, an apparatus (e.g., comprised or included in the wireless device) may be configured to perform the method described above. In some embodiments, the apparatus may include a memory and at least one processor in communication with the memory.

In some embodiments, a non-transitory computer readable memory medium storing program instructions executable by a processor (and/or processing circuitry) of the wireless device may be configured to perform the method described above.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio communicatively coupled to the antenna and configured to perform wireless communications according to at least one radio access technology (RAT);
at least one processor communicatively coupled to the at least one radio, wherein the at least one processor is configured to cause the wireless device to:
negotiate one or more timing parameters associated with a ranging procedure, wherein the one or more timing parameters indicate a time window during which an initiating device can initiate a ranging measurement, and wherein the one or more timing parameters are based, at least in part, on a time required to process timestamps of a measurement round;
perform a first ranging measurement associated with the ranging procedure; and
receive, after completion of the first ranging measurement, a message announcing initiation of a second ranging measurement associated with the ranging procedure, wherein the message is received during the time window indicated by the one or more timing parameters.

2. The wireless device of claim 1,
wherein a first parameter of the one or more timing parameters indicates a responding device's minimum time between ranging measurements; and
wherein a second parameter of the one or more timing parameters indicates a responding device's maximum time between ranging measurements.

3. The wireless device of claim 2,
wherein a third parameter of the one or more timing parameters indicates an initiating device's minimum time between ranging measurements;

wherein a fourth parameter of the one or more timing parameters indicates an initiating device's maximum time between ranging measurements; and wherein at least one of the first or second parameters is based, at least in part, on either or both of the third and fourth parameters.

4. The wireless device of claim 1:
wherein the at least one processor is further configured to cause the wireless device to:
enter, after completion of the first ranging measurement, a power saving mode for a first time period, wherein the first time period is based, at least in part, on the one or more timing parameters.

5. The wireless device of claim 4,
wherein the first time period is further based, at least in part, on a processing time associated with the first ranging measurement.

6. The wireless device of claim 1,
wherein, to perform the first ranging measurement associated with the ranging procedure, the one or more processors are further configured to:
receive, from a neighboring wireless device, an announcement indicating initiation of a first ranging measurement associated with the ranging procedure;
receive at a first time, a first measurement packet from the neighboring wireless device;
transmit, at a second time, a second measurement packet to the neighboring wireless device; and
transmit, at a third time, a first report to the neighboring wireless device, wherein the first report is associated with the ranging procedure.

7. The wireless device of claim 6,
wherein the first report includes timestamps associated with at least one of:
the first time and the second time; or
a prior ranging measurement.

8. The wireless device of claim 6,
wherein the first time and the second time are separated by a short interframe space; and
wherein the second time and the third time are separated by a short interframe space.

9. The wireless device of claim 6,
wherein the at least one processor is further configured to cause the wireless device to:
receive, at a fourth time, a second report associated with the ranging procedure from the neighboring wireless device, wherein the second report includes at least one of:
timestamps associated with transmission of the first measurement packet and reception of the second measurement packet by the neighboring wireless device; or
timestamps associated with transmission of a prior first measurement packet and reception of a prior second measurement packet by the neighboring wireless device.

10. An apparatus, comprising:
a memory; and
at least one processor in communication with the memory, wherein the at least one processor is configured to:
negotiate one or more timing parameters associated with a ranging procedure, wherein the one or more timing parameters indicate a time duration during which an initiating device can initiate a ranging measurement, wherein the one or more timing parameters are based, at least in part, on time limits on storing timestamps;

receive, from a neighboring wireless device, an announcement indicating initiation of a first ranging measurement associated with the ranging procedure;
receive at a first time, a first measurement packet from the neighboring wireless device;
generate instructions to transmit, at a second time, a second measurement packet to the neighboring wireless device;
generate instructions to transmit, at a third time, a first report to the neighboring wireless device, wherein the first report is associated with the ranging procedure; and
receive, after completion of the first ranging measurement, a message announcing initiation of a second ranging measurement associated with the ranging procedure, wherein the message is received during the time duration indicated by the one or more timing parameters.

11. The apparatus of claim 10,
wherein a first parameter of the one or more timing parameters indicates a responding device's minimum time between ranging measurements; and
wherein a second parameter of the one or more timing parameters indicates a responding device's maximum time between ranging measurements.

12. The apparatus of claim 11,
wherein a third parameter of the one or more timing parameters indicates an initiating device's minimum time between ranging measurements;
wherein a fourth parameter of the one or more timing parameters indicates an initiating device's maximum time between ranging measurements; and
wherein the first and/or second parameters are based, at least in part, on either or both of the third and fourth parameters.

13. The apparatus of claim 10,
wherein the one or more timing parameters are further based, at least in part, on a time required to process timestamps of a measurement round.

14. The apparatus of claim 10,
wherein the one or more timing parameters are further based, at least in part, on:
a processing requirement of the neighboring wireless device; and
a power saving requirement of the neighboring wireless device.

15. The apparatus of claim 10,
wherein the at least one processor is configured to: enter, after completion of the first ranging measurement, a power saving mode for a first time period, wherein the first time period is based, at least in part, on the one or more timing parameters and a processing time associated with the first ranging measurement.

16. A non-transitory computer readable memory medium storing program instructions executable by processing circuitry of a wireless device to:
negotiate one or more timing parameters associated with a ranging procedure comprising at least one ranging measurement, wherein the one or more timing parameters indicate a time window during which an initiating device can initiate a ranging measurement, and wherein the one or more timing parameters are based, at least in part, on a time required to process timestamps of a measurement round or time limits on storing timestamps;

receive, from a neighboring wireless device, an announcement indicating initiation of a first ranging measurement associated with the ranging procedure;

receive at a first time, a first measurement packet from the neighboring wireless device;

transmit, at a second time, a second measurement packet to the neighboring wireless device;

transmit, at a third time, a first report to the neighboring wireless device, wherein the first report is associated with the ranging procedure; and receive, after completion of the first ranging measurement, a message announcing initiation of a second ranging measurement of the ranging procedure, wherein the message is received during the time window indicated by the one or more timing parameters.

17. The non-transitory computer readable memory medium of claim 16, wherein the one or more timing parameters are further based, at least in part, on power saving requirements of the wireless device.

18. The non-transitory computer readable memory medium of claim 16, wherein the one or more timing parameters are further based, at least in part, on:

a processing requirement of the neighboring wireless device; and a power saving requirement of the neighboring wireless device.

19. The non-transitory computer readable memory medium of claim 16, wherein a first parameter of the one or more timing parameters indicates a responding device's minimum time between ranging measurements; and wherein a second parameter of the one or more timing parameters indicates a responding device's maximum time between ranging measurements.

20. The non-transitory computer readable memory medium of claim 16, wherein the program instructions are further executable to cause processing circuitry of the wireless device to:

enter, after completion of the first ranging measurement, a power saving mode for a first time period based, at least in part, on the one or more timing parameters and on a processing time associated with the first ranging measurement.

* * * * *